(12) United States Patent
Yang et al.

(10) Patent No.: US 11,057,899 B2
(45) Date of Patent: Jul. 6, 2021

(54) METHOD AND APPARATUS FOR RESOURCE ALLOCATION AND DETERMINATION

(71) Applicant: ZTE CORPORATION, Guangdong (CN)

(72) Inventors: Weiwei Yang, Shenzhen (CN); Bo Dai, Shenzhen (CN); Kun Liu, Shenzhen (CN); Xianming Chen, Shenzhen (CN); Huiying Fang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 175 days.

(21) Appl. No.: 16/322,859

(22) PCT Filed: Aug. 11, 2017

(86) PCT No.: PCT/CN2017/097216
§ 371 (c)(1),
(2) Date: Feb. 1, 2019

(87) PCT Pub. No.: WO2018/028696
PCT Pub. Date: Feb. 15, 2018

(65) Prior Publication Data
US 2020/0383113 A1    Dec. 3, 2020

(30) Foreign Application Priority Data

Aug. 12, 2016  (CN) .......................... 201610669189.2
Sep. 29, 2016  (CN) .......................... 201610865154.6
(Continued)

(51) Int. Cl.
*H04W 72/04*  (2009.01)
*H04W 4/80*   (2018.01)
*H04W 80/08*  (2009.01)

(52) U.S. Cl.
CPC ......... *H04W 72/0493* (2013.01); *H04W 4/80* (2018.02); *H04W 72/042* (2013.01);
(Continued)

(58) Field of Classification Search
CPC . H04W 72/0493; H04W 4/80; H04W 72/042; H04W 72/0446; H04W 72/0453; H04W 80/08
See application file for complete search history.

(56) References Cited

U.S. PATENT DOCUMENTS

2010/0067396 A1*  3/2010  Cui .......................... H04L 12/26
2015/0139104 A1   5/2015  Seo
(Continued)

FOREIGN PATENT DOCUMENTS

CN    101883434 A    11/2010
CN    102083226 A    6/2011
(Continued)

OTHER PUBLICATIONS

International Search Report for International Appl. No. PCT/CN2017/097216, dated Oct. 27, 2017.
(Continued)

*Primary Examiner* — Ronald B Abelson
(74) *Attorney, Agent, or Firm* — Foley & Lardner LLP

(57) ABSTRACT

Provided is a method apparatus for resource allocation and determination. The method includes: configuring, by a base station, a resource for transmission of a physical shared channel of a terminal through a resource allocation parameter, and sending, by the base station, the resource allocation parameter to the terminal through signaling, where the resource allocation parameter includes at least one of: a wideband indication, a resource location in a wideband, a subframe where the wideband is located, a wideband mode or a resource location.

18 Claims, 7 Drawing Sheets

Configure, by a base station, a resource for transmission of a physical shared channel of a terminal through a resource allocation parameter — S202

Send, by the base station, the resource allocation parameter to the terminal through signaling — S204

(30) Foreign Application Priority Data

Nov. 4, 2016 (CN) .................. 201610978286.X
Feb. 17, 2017 (CN) .................. 201710086083.4

(52) U.S. Cl.
CPC ... H04W 72/0446 (2013.01); H04W 72/0453 (2013.01); H04W 80/08 (2013.01)

(56) References Cited

U.S. PATENT DOCUMENTS

| | | | |
|---|---|---|---|
| 2016/0087744 A1* | 3/2016 | El Ayach | H04J 11/00 |
| 2016/0212746 A1* | 7/2016 | Wang | H04W 72/04 |
| 2016/0270038 A1* | 9/2016 | Papasakellariou | H04W 72/04 |
| 2017/0171856 A1* | 6/2017 | Zeng | H04W 72/04 |
| 2017/0280481 A1* | 9/2017 | Stern-Berkowitz | H04W 74/08 |
| 2018/0076924 A1* | 3/2018 | Lee | H04L 1/00 |
| 2019/0174283 A1* | 6/2019 | Awad | H04W 4/70 |

FOREIGN PATENT DOCUMENTS

| | | |
|---|---|---|
| CN | 103517429 A | 1/2014 |
| CN | 103687042 A | 3/2014 |
| CN | 103857041 A | 6/2014 |
| CN | 104221457 A | 12/2014 |
| CN | 105580421 A | 5/2016 |
| CN | 105846976 A | 8/2016 |

OTHER PUBLICATIONS

NEC., "PDSCH/PUSCH Resource allocation schemes for Rel-13 MTC", 3GPP TSG RAN WG1 Meeting #83; Agenda for Discussion and Decision regarding R1-156684, Anaheim, USA Nov. 15-22, 2015.

First Office Action for CN Appl. No. 201710086083.4, dated May 24, 2021.

First Search Report for CN Appl. No. 201710086083.4, dated May 13, 2021.

Panasonic: "CSI report/measurement in eMTC" 3GPP TSG RAN WG1 Meeting #83; R1-156953; Nov. 15-22, 2015; Anaheim, USA.

Panasonic: "Resource allocation of Pdsch/Pusch for Rel.12 MTC" 3GPP TSG RAN WG1 Meeting #82; R1-153967; Aug. 24-28, 2015; Beijing, China.

Samsung: "Time and Frequency Resource Allocation for DL/UL Channels" 3GPP TSG RAN WG1 #82; R1-154093; Aug. 24-28, 2015; Beijing, China.

* cited by examiner

METHOD AND APPARATUS FOR RESOURCE ALLOCATION AND DETERMINATION

CROSS-REFERENCE TO RELATED APPLICATIONS

This is a National Stage Application, under 35 U.S.C. 371, of International Patent Application No. PCT/CN2017/097216, filed on Aug. 11, 2017, which claims priority to Chinese Patent Application No. 201610669189.2, filed on Aug. 12, 2016, Chinese Patent Application No. 201610865154.6, filed on Sep. 29, 2016, Chinese Patent Application No. 201610978286.X, filed on Nov. 4, 2016, and Chinese Patent Application No. 201710086083.4, filed on Feb. 17, 2017, contents of all of which are incorporated herein by reference in their entireties.

TECHNICAL FIELD

The present disclosure relates to communications and, in particular, to a method and apparatus for resource allocation and determination.

BACKGROUND

Machine Type Communication (MTC), also referred to as Machine to Machine (M2M), is currently the primary application mode of the Internet of Things (IoT). Currently, the MTC device deployed on the market is mainly based on the global system of mobile communication (GSM) system. In recent years, more and more mobile operators have chosen Long Term Evolution/Long-Term Evolution Advance (LTE/LTE-A) as the evolution direction of the future wideband wireless communication system due to the high spectral efficiency of LTE/LTE-A. Various MTC data services based on LTE/LTE-A will also be more attractive.

Since the existing MTC terminal supports a narrowband with the maximum bandwidth of 1.4 MHz, in order to support the application of the MTC with a higher data rate, the user equipment (UE) needs to support new functions. One of them is to support a larger physical downlink shared channel (PDSCH)/physical uplink shared channel (PUSCH) channel bandwidth. The resource allocation of the PDSCH/PUSCH channel in the existing technology is designed for 1.4 MHz narrowband bandwidth limitation, so that the UE cannot support the application of the MTC with higher data rate.

SUMMARY

Embodiments of the present disclosure provide a method and apparatus for resource allocation and determination.

According to an aspect of the present disclosure, a method for resource allocation is provided. The method includes: configuring, by a base station, a resource for transmission of a physical shared channel of a terminal through a resource allocation parameter, and sending, by the base station, the resource allocation parameter to the terminal through signaling, where the resource allocation parameter includes at least one of: a wideband indication, a resource location in a wideband, a wideband enabling subframe, a wideband mode or a resource location.

According to another aspect of the present disclosure, a method for resource determination is provided. The method includes: receiving, by a terminal, a resource allocation parameter corresponding to a physical shared channel sent by a base station, and transmitting, by the terminal, the physical shared channel according to the resource allocation parameter, where the resource allocation parameter includes at least one of: a wideband indication, a resource location in a wideband, a wideband enabling subframe, a wideband mode or a resource location.

According to yet another aspect of the present disclosure, an apparatus for resource allocation is provided. The apparatus is applied to a base station and includes: a configuring module configured to configure a resource for transmission of a physical shared channel of a terminal through a resource allocation parameter; and a sending module configured to send the resource allocation parameter to the terminal through signaling; where the resource allocation parameter comprises at least one of: a wideband indication, a resource location in a wideband, a wideband enabling subframe, a wideband mode or a resource location.

According to yet another aspect of the present disclosure, an apparatus for resource determination is provided. The apparatus is applied to a terminal side and includes: a receiving module configured to receive a resource allocation parameter corresponding to a physical shared channel sent by a base station, and a transmitting module configured to transmit the physical shared channel according to the resource allocation parameter, where the resource allocation parameter includes at least one of: a wideband indication, a resource location in a wideband, a wideband enabling subframe, a wideband mode or a resource location.

According to yet another aspect of the present disclosure, a base station is provided. The base station includes: a processor, a memory configured to store instructions executable by the processor, and a transmission apparatus configured to perform data interaction externally according to the executable instructions stored in the memory. The processor controls the transmission apparatus to configure a resource for transmission of a physical shared channel of a terminal through a resource allocation parameter, and send the resource allocation parameter to the terminal through signaling, where the resource allocation parameter includes at least one of: a wideband indication, a resource location in a wideband, a wideband enabling subframe, a wideband mode or a resource location.

According to yet another aspect of the present disclosure, a terminal is provided. The terminal includes: a processor, a memory configured to store instructions executable by the processor, and a transmission apparatus configured to perform data interaction externally according to the executable instructions stored in the memory. The processor controls the transmission apparatus to receive a resource allocation parameter corresponding to a physical shared channel sent by a base station, and transmit the physical shared channel according to the resource allocation parameter, where the resource allocation parameter includes at least one of: a wideband indication, a resource location in a wideband, a wideband enabling subframe, a wideband mode or a resource location.

Another embodiment of the present disclosure further provides a storage medium. The storage medium is configured to store program codes for executing the steps described below.

A resource is configured for transmission of a physical shared channel of a terminal through a resource allocation parameter, and the resource allocation parameter is sent to the terminal through signaling, where the resource allocation parameter includes at least one of: a wideband indication, a resource location in a wideband, a subframe where the wideband is located or a wideband mode.

Through the embodiments of the present disclosure, the base station configures a resource for transmission of a physical shared channel of a terminal through a resource allocation parameter, and sends the resource allocation parameter to the terminal. In such a way, the resource allocation considers not only 1.4 MHz narrowband bandwidth limitation, the MTC terminal supports MTC applications with higher data rate.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. Among the drawings.

DETAILED DESCRIPTION

Hereinafter the present disclosure will be described in detail with reference to the drawings in conjunction with the embodiments. It should be noted that if not in collision, the embodiments and features therein in the present application may be combined with each other.

Embodiment 1

Figure 1:
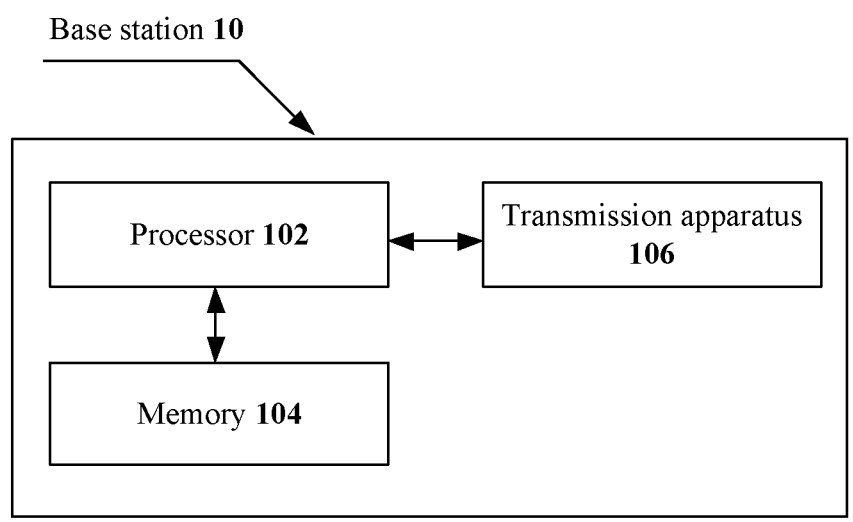
FIG. 1 is a block diagram of a hardware structure of a base station for implementing a method for resource allocation according to an embodiment of the present disclosure.
Figure 15:
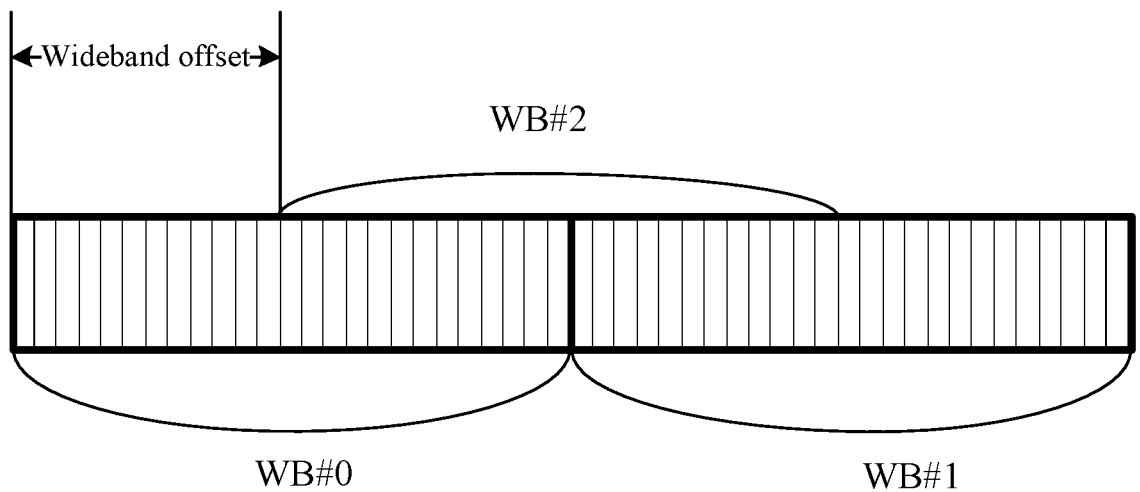
FIG. 15 is a schematic diagram 2 of a wideband preset index according to an embodiment of the present disclosure.

A method embodiment provided by the embodiment 1 of the present application may be executed in a mobile terminal, a base station or other similar computing devices. In an example in which the method is executed in the base station, FIG. 1 is a block diagram of a hardware structure of a base station for implementing a method for resource allocation according to an embodiment of the present disclosure. As shown in FIG. 1, the base station 10 may include one or more (only one is shown in FIG. 15) processors 102 (the processors 102 may include, but are not limited to, a processing device such as a microprocessor MCU or a programmable logic device FPGA), a memory 104 configured to store data, and a transmission apparatus 106 configured to implement a communication function. It should be understood by those of ordinary skill in the art that the structure shown in FIG. 1 is merely illustrative and not intended to limit the structure of the electronic apparatus described above. For example, the base station 10 may further include more or less components than the components shown in FIG. 1, or has a configuration different from the configuration shown in FIG. 1.

The memory 104 may be configured to store software programs and modules of application software, such as program instructions/modules corresponding to the method for resource allocation in the embodiment of the present disclosure. The processor 102 executes the software programs and modules stored in the memory 104 to perform functional applications and data processing, that is, to implement the method described above. The memory 104 may include a high-speed random access memory, and may further include a nonvolatile memory, such as one or more magnetic storage apparatuses, flash memories or other non-volatile solid-state memories. In some examples, the memory 104 may further include memories that are remotely disposed with respect to the processor 102. These remote memories may be connected to the base station 10 via a network. Examples of the network described above include, but are not limited to, the Internet, an intranet, a local area network, a mobile communication network and a combination thereof.

The transmission apparatus 106 is configured to receive or send data via a network. Specific examples of such a network may include a wireless network provided by a communication provider of the base station 10. In one example, the transmission apparatus 106 includes a network interface controller (NIC), which may be connected to other network devices via a base station and thus be capable of communicating with the Internet. In one example, the transmission apparatus 106 may be a radio frequency (RF) module, which is used for communicating with the Internet in a wireless way.

Figure 2:
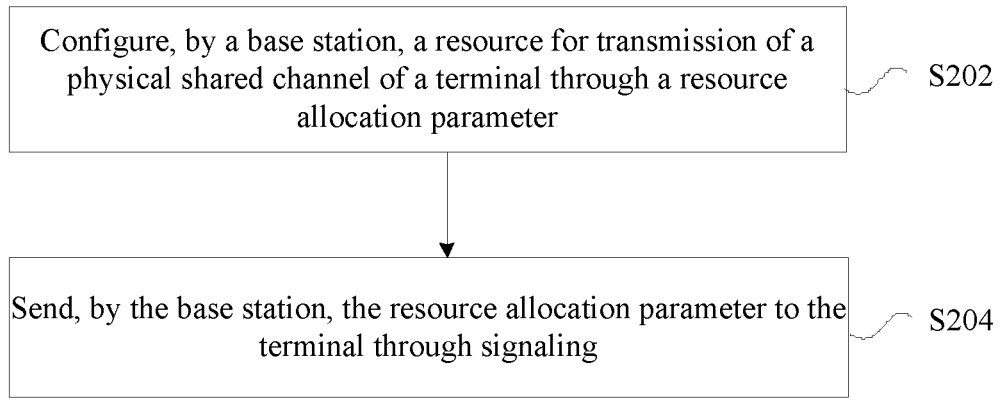
FIG. 2 is a flowchart of a method for resource allocation according to an embodiment of the present disclosure.

This embodiment provides a method for resource allocation executed in the base station described above. FIG. 2 is a flowchart of a method for resource allocation according to an embodiment of the present disclosure. As shown in FIG. 2, the method includes the steps described below.

In step S202, a base station configures a resource for transmission of a physical shared channel of a terminal through a resource allocation parameter.

In step S204, the base station sends the resource allocation parameter to the terminal through signaling.

The resource allocation parameter includes at least one of: a wideband indication, a resource location in a wideband, a subframe where the wideband is located, a wideband mode or a resource location.

Through the step S202 and the step S204 in this embodiment, the base station configures the resource for transmission of the physical shared channel of the terminal through the resource allocation parameter, and sends the resource allocation parameter to the terminal. In such a way, the resource allocation considers not only 1.4 MHz narrowband bandwidth limitation, the MTC terminal supports MTC applications with higher data rate. In order to implement the MTC applications with higher data rate, different types of terminals support the data channel bandwidth as follows.

A bandwidth limited (BL) UE with a reception bandwidth of 5 MHz works in a coverage enhancement (CE) mode A and a CE mode B with a maximum PDSCH/PUSCH channel bandwidth of 1.4 MHz.

The BL UE with the reception bandwidth of 5 MHz works in the CE mode A and the CE mode B with a maximum PDSCH channel bandwidth of 5 MHz.

The BL UE with the reception bandwidth of 5 MHz works in the CE mode A with a maximum PUSCH channel bandwidth of 5 MHz.

A non-BL UE works in the CE mode A and the CE mode B with the maximum PDSCH/PUSCH channel bandwidth of 1.4 MHz.

The non-BL UE works in the CE mode A with the maximum PDSCH/PUSCH channel bandwidth of 5 MHz.

The non-BL UE works in the CE mode A with the maximum PDSCH/PUSCH channel bandwidth of 20 MHz.

The non-BL UE works in the CE mode B with the maximum PDSCH channel bandwidth of 5 MHz.

The non-BL UE works in the CE mode B with the maximum PDSCH channel bandwidth of 20 MHz.

In an optional embodiment, the wideband indication described in this embodiment is determined according to at least one of: a wideband preset index, a wideband offset, a narrowband index or a resource location.

The wideband preset index is determined according to a location of the wideband in a system bandwidth. The wideband offset is one of: the number of narrowbands or physical resource blocks (PRBs) of a offset of a wideband starting location relative to a preset wideband starting location, or the number of narrowbands or PRBs of the offset of the wideband starting location relative to a preset narrowband starting location, or the wideband starting location and a number of PRBs of a preset PRB offset. The narrowband index is a narrowband index corresponding to a starting narrowband of the wideband.

It is to be noted that the wideband has a basic unit of narrowband: the wideband includes a number X of narrowbands, and a total bandwidth of the wideband does not exceed a number Y of RBs, where the X narrowbands are X narrowbands with continuous narrowband indexes; or the wideband has a basic unit of RB: the wideband includes the number Y of RBs, where the Y RBs are Y RBs with continuous RB indexes; where X and Y are preset values.

The wideband includes a narrowband where downlink control information (DCI) is located.

In another optional embodiment, the widebands involved in this embodiment partially overlap or do not overlap. The partial overlap between the widebands includes Z narrowbands or P PRBs overlapping between the widebands, where Z and P are positive integers greater than 0.

In another optional embodiment, the resource location in the wideband involved in this embodiment is determined through at least one parameter of a group consisting of: narrowband enabling in the wideband, an RB set in the narrowband, a narrowband set in the wideband, an RB set in the wideband, a starting location of an RB set in the wideband and a number of RB sets in the wideband, RB set enabling in the wideband, a resource starting location in the wideband and a resource ending location in the wideband.

The resource block group includes a number N of RBs, where N has a fixed value, or is determined according to the number of RBs in the wideband, or is determined according to the number of RBs in the system bandwidth.

In another optional embodiment, the resource location involved in this embodiment includes at least one of: a resource starting location, a resource ending location and a number of resources.

In another optional embodiment, the wideband mode involved in this embodiment includes a wideband mode and a narrowband mode.

Based on the step S202 and the step S204 described above, the manner in which the base station sends the resource allocation parameter to the terminal through signaling may be that the base station sends the resource allocation parameter to the terminal through at least one of high-layer signaling or downlink control information (DCI).

The manner in which the base station sends the resource allocation parameter to the terminal through at least one of the high-layer signaling or the DCI in a specific application scenario may be one of the followings.

(1) The base station sends the wideband indication to the terminal through at least one of the high-layer signaling or the DCI.

The wideband indication occupies a number x of bits for indicating the wideband preset index; or the wideband indication occupies a number x1+x2 of bits for indication, where x1 bits indicate the wideband preset index, and x2 bits indicate the wideband offset.

(2) The base station sends the resource location in the wideband to the terminal through the DCI.

The resource location in the wideband is indicated in at least one of following modes:

a mode 1: the resource location in the wideband occupies a number y1+y2 of bits for indication, where y1 is equal to the number of narrowbands in the wideband, and y2 bits indicate the RB set in the narrowband;

a mode 2: the resource location in the wideband occupies a number y3+y2 of bits for indication, where y3 is determined according to the number of narrowbands in the wideband, and y2 bits indicate the RB set in the narrowband;

a mode 3: the resource location in the wideband occupies a number y4 of bits for indicating the RB set in the wideband, where y4 is determined according to the number of RBs in the wideband;

a mode 4: the resource location in the wideband occupies a number y5 of bits for indicating the starting location of the RB set in the wideband and the number of the RB sets in the wideband, where y5 is determined according to the number of RB groups in the wideband;

a mode 5: the resource location in the wideband occupies a number y6 of bits for indicating an RB group enabling state in the wideband, where y6 is equal to a number of PRB groups in the wideband;

a mode 6: the resource location in the wideband occupies a number y7 of bits for indicating the resource starting location in the wideband and the resource ending location in the wideband;

a mode 7: the resource location in the wideband occupies a number y8+y9 of bits for indication, where y8 bits indicate the resource starting location in the wideband, and y9 bits indicate the resource ending location in the wideband;

a mode 8: the resource location in the wideband occupies a number M of bits for indicating the RB set in the wideband and the RB group set in the wideband; and a mode 9: the resource location in the wideband occupies the number y1 of bits for indicating the narrowband enabling state in the wideband, where y1 has a value less than or equal to the number of narrowbands in the wideband.

(3) The base station sends the resource location to the terminal through the DCI. The resource location is indicated in at least one of following modes:

the resource location occupies a number y10+y11 of bits for indication, where y10 bits indicate the resource starting location, and y11 bits indicate the resource ending location;

the resource location occupies a number y12 of bits for indicating the resource starting location and the resource ending location;

the resource location occupies a number y10+y13 of bits for indication, where y10 bits indicate the resource starting location, and y13 bits indicate the number of resources; and the resource location occupies a number y14 of bits for indicating the resource starting location and the resource ending location.

(4) The base station sends the wideband enabling subframe to the terminal through the high-layer signaling.

The base station sends the wideband enabling subframe to the terminal through the high-layer signaling, where the wideband enabling subframe occupies a number 10*z of bits for indication, and z is a fixed positive integer.

(5) The base station sends the wideband mode to the terminal through the high-layer signaling, where the wideband mode occupies 1 bit for indication.

Embodiment 2

Figure 3:
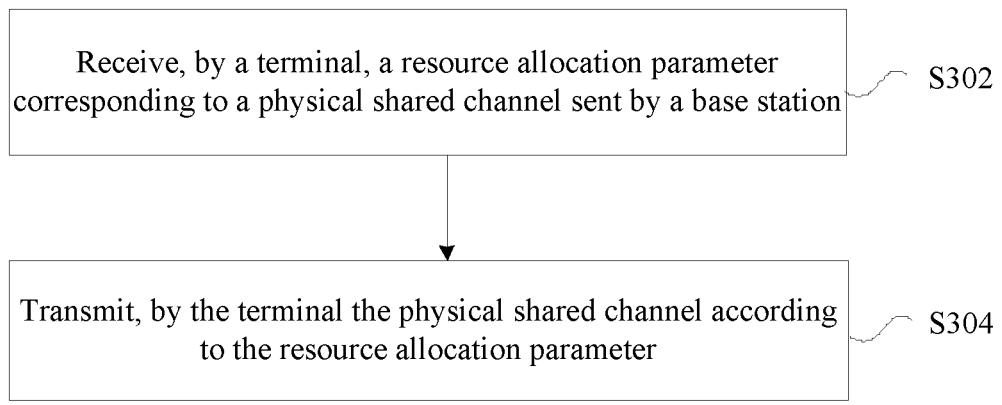
FIG. 3 is a flowchart of a method for resource determination according to an embodiment of the present disclosure.

FIG. 3 is a flowchart of a method for resource determination according to an embodiment of the present disclosure. As shown in FIG. 3, the method includes steps described below.

In step S302, a terminal receives a resource allocation parameter corresponding to a physical shared channel sent by a base station.

In step S304, the terminal transmits the physical shared channel according to the resource allocation parameter.

The resource allocation parameter includes at least one of: a wideband indication, a resource location in a wideband, a wideband enabling subframe, a wideband mode or a resource location.

It is to be noted that this embodiment is a method embodiment applied to a terminal side corresponding to the method embodiment applied to the base station side in the embodiment 1. The description of corresponding features has been described in the above embodiment 1, which will not be repeated herein.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, or the like) to execute the method according to each embodiment of the present disclosure.

Embodiment 3

Embodiments of the present disclosure further provide an apparatus for resource allocation for implementing the above-mentioned embodiments and preferred embodiments. What has been described will not be repeated. As used below, the term "module" may be software, hardware or a combination thereof capable of implementing predetermined functions. The apparatus in the embodiments described below is preferably implemented by software, but implementation by hardware or by a combination of software and hardware is also possible and conceived.

Figure 4:
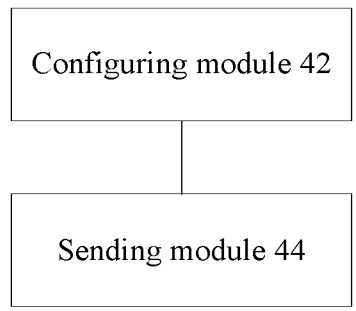
FIG. 4 is a block diagram of an apparatus for resource allocation according to an embodiment of the present disclosure.

FIG. 4 is a block diagram of an apparatus for resource allocation according to an embodiment of the present disclosure. The apparatus is applied to a terminal side. As shown in FIG. 4, the apparatus includes a configuring module 42 and a sending module 44. The configuring module 42 is configured to configure a resource for transmission of a physical shared channel of a terminal through a resource allocation parameter. The sending module 44 is coupled to the configuring module 42 and is configured to send the resource allocation parameter to the terminal through signaling.

The resource allocation parameter includes at least one of: a wideband indication, a resource location in a wideband, a wideband enabling subframe, a wideband mode or a resource location.

It is to be noted that this embodiment is an apparatus embodiment corresponding to the method embodiment in the embodiment 1.

Through this embodiment, the base station configures the resource for transmission of the physical shared channel of the terminal through the resource allocation parameter, and sends the resource allocation parameter to the terminal. In such a way, the resource allocation considers not only 1.4 MHz narrowband bandwidth limitation, the MTC terminal supports MTC applications with higher data rate. In order to implement the MTC applications with higher data rate, different types of terminals support the data channel bandwidth as follows.

A bandwidth limited (BL) UE with a reception bandwidth of 5 MHz works in a coverage enhancement (CE) mode A and a CE mode B with a maximum PDSCH/PUSCH channel bandwidth of 1.4 MHz.

The BL UE with the reception bandwidth of 5 MHz works in the CE mode A and the CE mode B with a maximum PDSCH channel bandwidth of 5 MHz.

The BL UE with the reception bandwidth of 5 MHz works in the CE mode A with a maximum PUSCH channel bandwidth of 5 MHz.

A non-BL UE works in the CE mode A and the CE mode B with the maximum PDSCH/PUSCH channel bandwidth of 1.4 MHz.

The non-BL UE works in the CE mode A with the maximum PDSCH/PUSCH channel bandwidth of 5 MHz.

The non-BL UE works in the CE mode A with the maximum PDSCH/PUSCH channel bandwidth of 20 MHz.

The non-BL UE works in the CE mode B with the maximum PDSCH channel bandwidth of 5 MHz.

The non-BL UE works in the CE mode B with the maximum PDSCH channel bandwidth of 20 MHz.

In an optional embodiment, the wideband indication described in this embodiment is determined according to at least one of: a wideband preset index, a wideband offset, a narrowband index or a resource location.

The wideband preset index is determined according to a location of the wideband in a system bandwidth. The wideband offset is one of: the number of narrowbands or physical resource blocks (PRBs) of a offset of a wideband starting location relative to a preset wideband starting location, or the number of narrowbands or PRBs of the offset of the wideband starting location relative to a preset narrowband starting location, or the wideband starting location and a number of PRBs of a preset PRB offset. The narrowband index is a narrowband index corresponding to a starting narrowband of the wideband.

In an optional embodiment, the wideband involved in this embodiment has a basic unit of narrowband: the wideband includes a number X of narrowbands, and a total bandwidth of the wideband does not exceed a number Y of RBs, where the X narrowbands are X narrowbands with continuous narrowband indexes; or
the wideband has a basic unit of RB: the wideband includes the number Y of RBs, where the Y RBs are Y RBs with continuous RB indexes; where X and Y are preset values.

The wideband includes a narrowband where downlink control information (DCI) is located.

In an optional embodiment, the widebands involved in this embodiment partially overlap or do not overlap. The partial overlap between the widebands includes Z narrowbands or P PRBs overlapping between the widebands, where Z and P are positive integers greater than 0.

In an optional embodiment, the resource location in the wideband involved in this embodiment is determined through at least one parameter of a group consisting of: narrowband enabling in the wideband, an RB set in the narrowband, a narrowband set in the wideband, an RB set in the wideband, a starting location of an RB set in the wideband and a number of RB sets in the wideband, RB set enabling in the wideband, a resource starting location in the wideband and a resource ending location in the wideband.

The resource block group includes a number N of RBs, where N has a fixed value, or is determined according to the number of RBs in the wideband, or is determined according to the number of RBs in the system bandwidth.

In another optional embodiment, the resource location involved in this embodiment includes at least one of: a resource starting location, a resource ending location and a number of resources.

In another optional embodiment, the wideband mode involved in this embodiment includes a wideband mode and a narrowband mode.

It is to be noted that the sending module involved in this embodiment is further configured to send the resource allocation parameter to the terminal through at least one of high-layer signaling or DCI.

Based on that the sending module is further configured to send the resource allocation parameter to the terminal through at least one of high-layer signaling or DCI, the sending module in this embodiment is further configured to implement one of following modes.

In a mode 1, the sending module is configured to send the wideband indication to the terminal through at least one of the high-layer signaling or the DCI. The wideband indication occupies a number x of bits for indicating the wideband preset index; or the wideband indication occupies a number x1+y2 of bits for indication, where x1 bits indicate the wideband preset index, and x2 bits indicate the wideband offset.

In a mode 2, the sending module is configured to send the resource location in the wideband to the terminal through the DCI. The resource location in the wideband is indicated in at least one of following modes:
the resource location in the wideband occupies a number y1+y2 of bits for indication, y1 bits indicate the narrowband enabling state in the wideband, and y2 bits indicate the RB set in the narrowband;
the resource location in the wideband occupies a number y3+y2 of bits for indication, y3 bits indicate the narrowband set, and y2 bits indicate the RB set in the narrowband;
the resource location in the wideband occupies a number y4 of bits for indicating the RB set in the wideband;
the resource location in the wideband occupies a number y5 of bits for indicating the starting location of the RB set in the wideband and the number of RB sets in the wideband;
the resource location in the wideband occupies a number y7 of bits for indicating the resource starting location in the wideband and the resource ending location in the wideband;
the resource location in the wideband occupies a number y8+y9 of bits for indication, y8 bits indicate the resource starting location in the wideband, and y9 bits indicate the resource ending location in the wideband;
the resource location in the wideband occupies a number M of bits for indicating the RB set in the wideband and the RB group set in the wideband; and
the resource location in the wideband occupies the number y1 of bits for indicating the narrowband enabling state in the wideband, where y1 has a value less than or equal to the number of narrowbands in the wideband.

In a mode 3, the sending module is configured to send the resource location to the terminal through the DCI. The resource location is indicated in at least one of following modes:
the resource location occupies a number y10+y11 of bits for indication, where y10 bits indicate the resource starting location, and y11 bits indicate the resource ending location;
the resource location occupies a number y12 of bits for indicating the resource starting location and the resource ending location;
the resource location occupies a number y10+y13 of bits for indication, where y10 bits indicate the resource starting location, and y13 bits indicate the number of resources; and
the resource location occupies a number y14 of bits for indicating the resource starting location and the resource ending location.

In a mode 4, the sending module is configured to send the subframe where the wideband is located to the terminal through the high-layer signaling, where the subframe where the wideband is located occupies a number 10*z of bits for indication, and z is a fixed positive integer.

In a mode 5, the sending module is configured to send the subframe where the wideband is located to the terminal through the high-layer signaling, where the wideband mode is indicated by 1-bit high-layer signaling.

Embodiment 4

Figure 5:
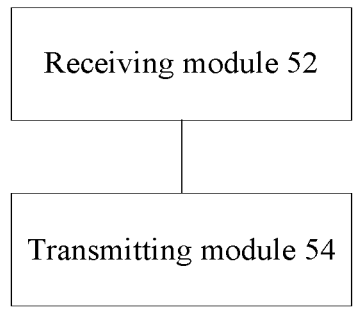
FIG. 5 is a block diagram of an apparatus for resource determination according to an embodiment of the present disclosure.

FIG. 5 is a block diagram of an apparatus for resource determination according to an embodiment of the present disclosure. The apparatus is applied to a terminal side. As shown in FIG. 5, the apparatus includes a receiving module 52 and a transmitting module 54. The receiving module 52 is configured to receive a resource allocation parameter corresponding to a physical shared channel sent by a base station. The transmitting module 54 is coupled to the receiving module 52 and is configured to transmit the physical shared channel according to the resource allocation parameter.

The resource allocation parameter includes at least one of: a wideband indication, a resource location in a wideband, a subframe where the wideband is located, a wideband mode or a resource location.

It is to be noted that this embodiment is an apparatus embodiment corresponding to the method embodiment in the embodiment 2.

It should be noted that the various modules described above may be implemented by software or hardware. Implementation by hardware may, but may not necessarily, be performed in the following manner: the various modules described above are located in a same processor, or the various modules described above are located in their respective processors in any combination form.

Embodiment 5

Based on the embodiment 3 and the embodiment 4 described above, this embodiment provides a system for resource allocation. The system includes the apparatus in the embodiment 3 and the apparatus in the embodiment 4.

Based on the embodiments 1 to 5 described above, the present disclosure will be described below in detail in conjunction with specific embodiments.

Embodiment 6

Figure 6A:
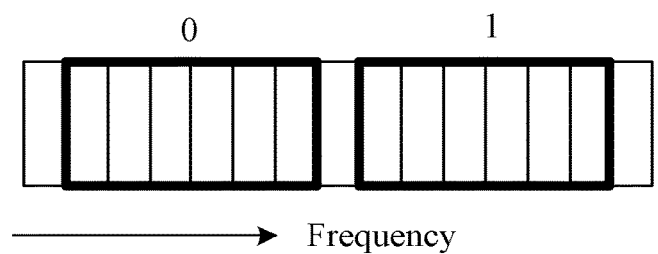
FIGS. 6A-6E are schematic diagrams of definitions of a narrowband in the related art.
Figure 6B:
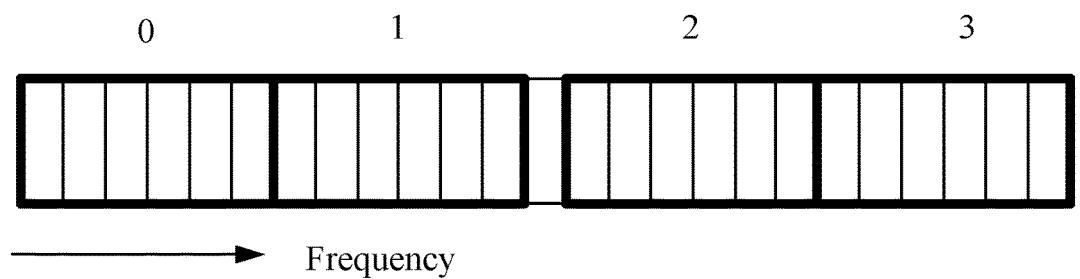
Figure 6C:
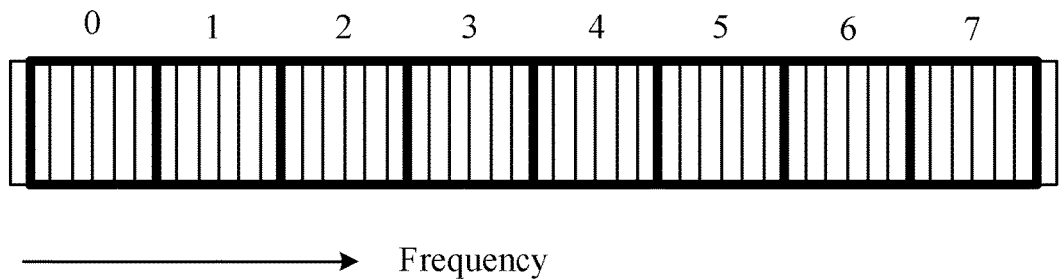
Figure 6D:
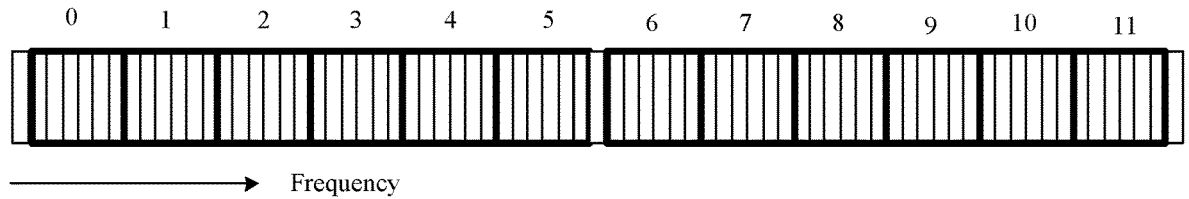
Figure 6E:
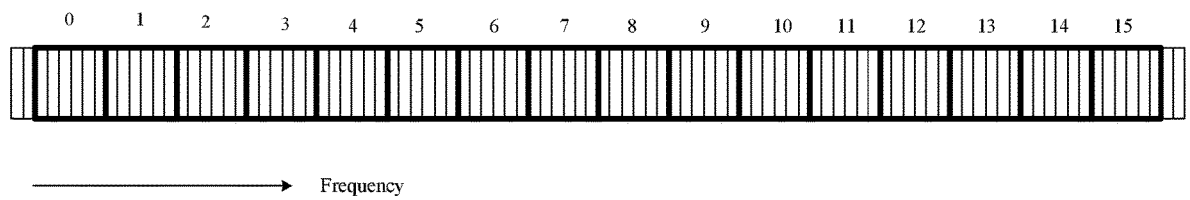

FIGS. 6A-6E are schematic diagrams of definitions of a narrowband in the related art. FIG. 6A shows the system bandwidth of 3 MHz, FIG. 6B shows the system bandwidth of 5 MHz, FIG. 6C shows the system bandwidth of 10 MHz, FIG. 6D shows the system bandwidth of 15 MHz, and FIG. 6E shows the system bandwidth of 20 MHz.

This embodiment provides a method for resource allocation. The method includes steps described below.

In step S302, the base station configures a resource for transmission of a physical shared channel of a terminal through a resource allocation parameter, where the resource allocation parameter includes at least one of: a wideband indication, a resource location in a wideband, a subframe where the wideband is located, a wideband mode or a resource location.

Inn step S304, the base station sends the resource allocation parameter to the terminal through signaling.

The embodiment will be described hereinafter in conjunction with specific embodiments.

Specific Embodiment 1

Assuming that the PDSCH/PUSCH transmission supports a larger channel bandwidth (i.e., wideband), and assuming that the bandwidth of the wideband is 5 MHz, the basic unit of the wideband is narrowband, the widebands do not overlap with each other, and the wideband indication is determined according to the wideband preset index.

Specific Embodiment 1-1

Figure 7:
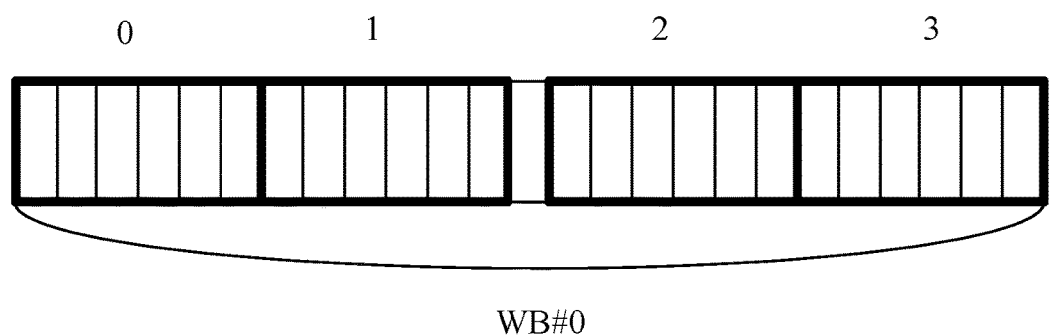
FIG. 7 is a schematic diagram of wideband division with a system bandwidth of 5 MHz according to an embodiment of the present disclosure.

In a case where the system bandwidth is 5 MHz, the wideband division is as shown in FIG. 7.

There is one wideband, that is, the wideband NB0~NB3; and the wideband does not need to be indicated by the wideband indication. FIG. 7 is a schematic diagram of wideband division with a system bandwidth of 5 MHz according to an embodiment of the present disclosure.

Specific Embodiment 1-2

Figure 8:
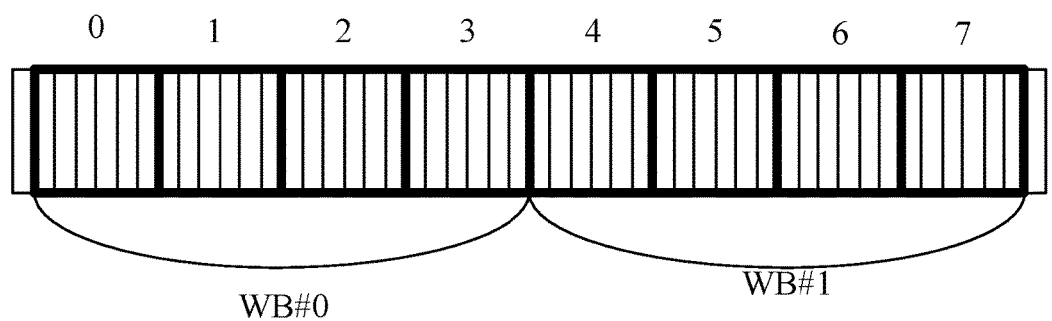
FIG. 8 is a schematic diagram 1 of wideband division with a system bandwidth of 10 MHz according to an embodiment of the present disclosure.

In a case where the system bandwidth is 10 MHz, the wideband division is as shown in FIG. 8. There are two widebands, that is, the wideband NB0~NB3 and the wideband NB4~NB7 exist. The preset index corresponding to the wideband NB0~NB3 is 0 and the preset index corresponding to the wideband NB4~NB7 is 1. FIG. 8 is a schematic diagram 1 of wideband division with a system bandwidth of 10 MHz according to an embodiment of the present disclosure.

The base station sends the wideband indication to the terminal through the high-layer signaling and/or the DCI. The wideband indication occupies 1 bit to perform the indication. For example, the wideband indication '0' represents the wideband NB0~NB3, and the wideband indication '1' represents the wideband NB4~NB7.

Specific Embodiment 1-3

Figure 9:
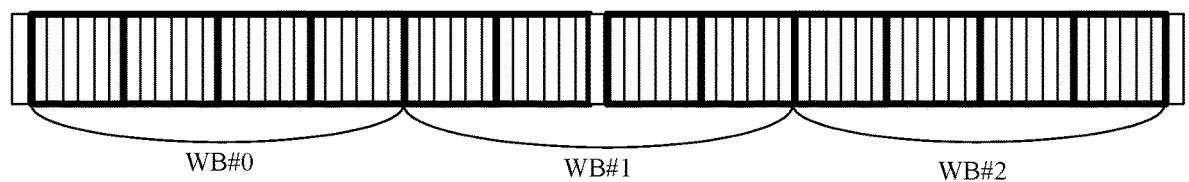
FIG. 9 is a schematic diagram of wideband division with a system bandwidth of 15 MHz according to an embodiment of the present disclosure.

In a case where the system bandwidth is 15 MHz, the wideband division is as shown in FIG. 9. There are three widebands, that is, the wideband NB0~NB3, the wideband NB4~NB7 and the wideband NB8~NB11. The preset index corresponding to the wideband NB0~NB3 is 0, the preset index corresponding to the wideband NB4~NB7 is 1, and the preset index corresponding to the wideband NB8~NB11 is 2. FIG. 9 is a schematic diagram of wideband division with a system bandwidth of 15 MHz according to an embodiment of the present disclosure.

The base station sends the wideband indication to the terminal through the high-layer signaling and/or the DCI. The wideband indication occupies 2 bits to perform the indication. For example, the wideband indication '00' represents the wideband NB0~NB3, the wideband indication '01' represents the wideband NB4~NB7, and the wideband indication '10' represents the wideband NB8~NB11.

Specific Embodiment 1-4

Figure 10:
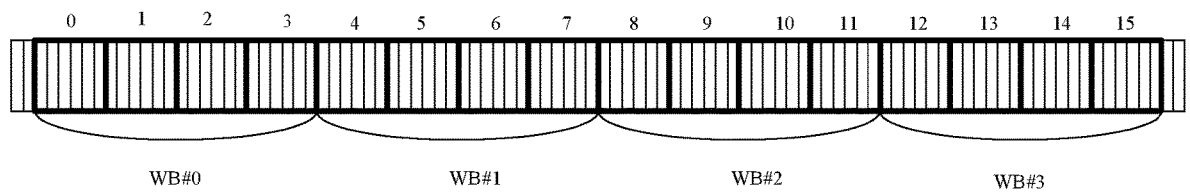
FIG. 10 is a schematic diagram of wideband division with a system bandwidth of 20 MHz according to an embodiment of the present disclosure.

In a case where the system bandwidth is 20 MHz, the wideband division is as shown in FIG. 10. There are four widebands, that is, the wideband NB0~NB3, the wideband NB4~NB7, the wideband NB8~NB11 and the wideband NB12~NB15. The preset index corresponding to the wideband NB0~NB3 is 0, the preset index corresponding to the wideband NB4~NB7 is 1, the preset index corresponding to the wideband NB8~NB11 is 2, and the preset index corresponding to the wideband NB12~NB15 is 3. FIG. 10 is a schematic diagram of wideband division with a system bandwidth of 20 MHz according to an embodiment of the present disclosure.

The base station sends the wideband indication to the terminal through the high-layer signaling and/or the DCI. The wideband indication occupies 2 bits to perform the indication. For example, the wideband indication '00' represents the wideband NB0~NB3, the wideband indication '01' represents the wideband NB4~NB7, the wideband indication '10' represents the wideband NB8~NB11, and the wideband indication '11' represents the wideband NB12~NB15.

Specific Embodiment 2

Assuming that the PDSCH/PUSCH transmission supports a larger channel bandwidth (i.e., wideband), and assuming that the bandwidth of the wideband is 5 MHz, the basic unit of the wideband is RB, the widebands do not overlap with each other, and the wideband indication is determined according to the wideband preset index.

Figure 11:
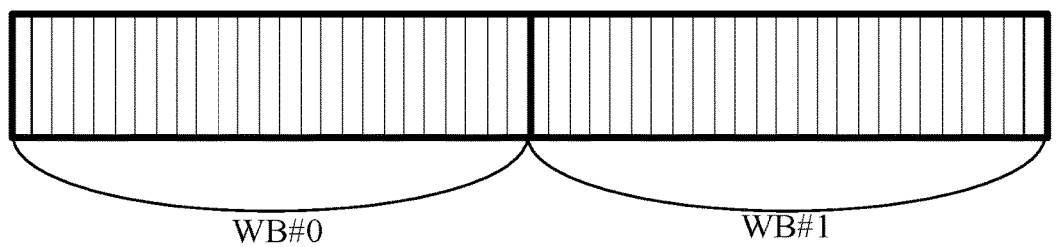
FIG. 11 is a schematic diagram 2 of wideband division with a system bandwidth of 10 MHz according to an embodiment of the present disclosure.

In a case where the system bandwidth is 10 MHz, the wideband division is as shown in FIG. 11. There are widebands, that is, the wideband RB0~RB24 and the wideband RB25~RB49. The preset index corresponding to the wideband RB0~RB24 is 0 and the preset index corresponding to the wideband RB25~RB30 is 1. FIG. 11 is a schematic diagram 2 of wideband division with a system bandwidth of 10 MHz according to an embodiment of the present disclosure.

The base station sends the wideband indication to the terminal through the high-layer signaling and/or the DCI. The wideband indication occupies 1 bit to perform the indication. For example, the wideband indication '0' represents the wideband RB0~RB24, and the wideband indication '1' represents the wideband RB25~RB49.

Specific Embodiment 3

Assuming that the PDSCH/PUSCH transmission supports a larger channel bandwidth (i.e., wideband), and assuming that the bandwidth of the wideband is 5 MHz, the basic unit of the wideband is narrowband, the widebands overlap with each other, and the wideband indication is determined according to the wideband preset index.

Specific Embodiment 3-1

Figure 12:
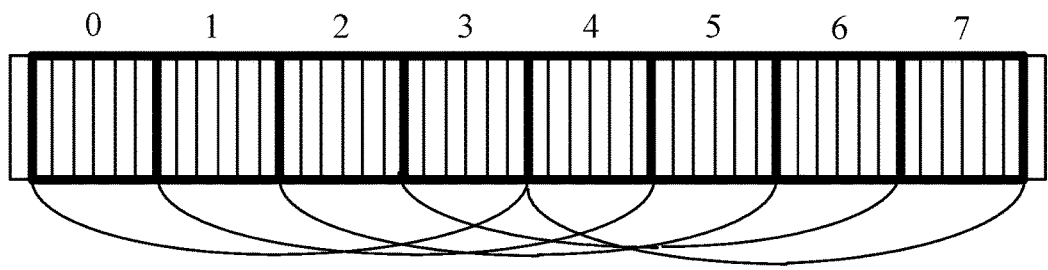
FIG. 12 is a schematic diagram 3 of wideband division with a system bandwidth of 10 MHz according to an embodiment of the present disclosure.

In a case where the system bandwidth is 10 MHz, the wideband division is as shown in FIG. 12. There are five widebands, that is, the wideband NB0~NB3, the wideband NB1~NB4, the wideband NB2~NB5, the wideband NB3~NB6 and the wideband NB4~NB7. The preset index corresponding to the wideband NB0~NB3 is 0, the preset index corresponding to the wideband NB1~NB4 is 1, the preset index corresponding to the wideband NB2~NB5 is 2, the preset index corresponding to the wideband NB3~NB6 is 3, and the preset index corresponding to the wideband NB4~NB7 is 4. FIG. 12 is a schematic diagram 3 of wideband division with a system bandwidth of 10 MHz according to an embodiment of the present disclosure.

The base station sends the wideband indication to the terminal through the high-layer signaling and/or the DCI. The wideband indication occupies 3 bits to perform the indication. For example, the wideband indication '000' represents the wideband NB0~NB3, the wideband indication '001' represents the wideband NB1~NB4, the wideband indication '010' represents the wideband NB2~NB5, the wideband indication '011' represents the wideband NB3~NB6, and the wideband indication '100' represents the wideband NB4~NB7.

Specific Embodiment 3-2

Figure 13:
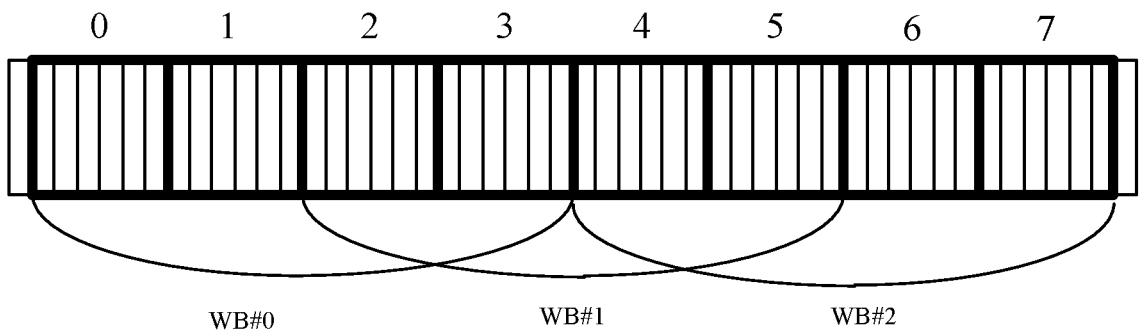
FIG. 13 is a schematic diagram 4 of wideband division with a system bandwidth of 10 MHz according to an embodiment of the present disclosure.

In a case where the system bandwidth is 10 MHz, the wideband division is as shown in FIG. 13. There are three widebands, that is, the wideband NB0~NB3, the wideband NB2~NB5 and the wideband NB4~NB7. The preset index corresponding to the wideband NB0~NB3 is 0, the preset index corresponding to the wideband NB2~NB5 is 1, and the preset index corresponding to the wideband NB4~NB7 is 2. FIG. 13 is a schematic diagram 4 of wideband division with a system bandwidth of 10 MHz according to an embodiment of the present disclosure.

The base station sends the wideband indication to the terminal through the high-layer signaling and/or the DCI. The wideband indication occupies 2 bits to perform the indication. For example, the wideband indication '00' represents the wideband NB0~NB3, the wideband indication '01' represents the wideband NB2~NB5, and the wideband indication '10' represents the wideband NB4~NB7.

Specific Embodiment 4

Assuming that the PDSCH/PUSCH transmission supports a larger channel bandwidth (i.e., wideband), and assuming that the bandwidth of the wideband is 5 MHz, the basic unit of the wideband is narrowband, and the widebands do not overlap with each other. The basic unit of the wideband offset is narrowband and the specific number of the wideband offset is 1 narrowband. The preset wideband corresponding to the wideband offset is the wideband 0. The wideband indication is determined according to the wideband preset index and the wideband offset.

Figure 14:
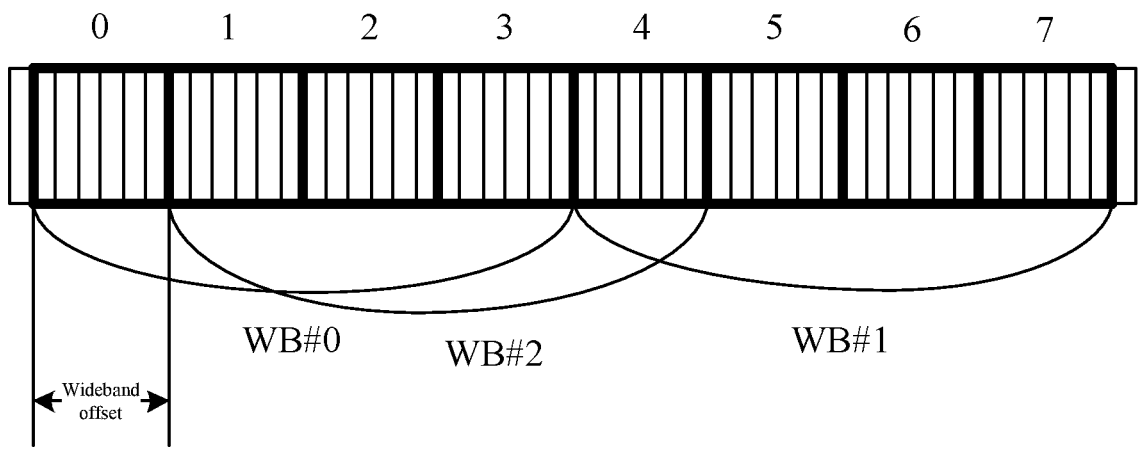
FIG. 14 is a schematic diagram 1 of a wideband preset index according to an embodiment of the present disclosure.

In a case where the system bandwidth is 10 MHz, the wideband indication is determined in a manner with the system bandwidth of 10 MHz shown in the specific embodiment 1-2 of the specific embodiment 1, as shown in FIG. 14. FIG. 14 is a schematic diagram 1 of a wideband preset index according to an embodiment of the present disclosure.

The base station sends the wideband indication to the terminal through the high-layer signaling and/or the DCI. The wideband preset index occupies 1 bit to perform the indication, and the wideband offset occupies 1 bit to perform the indication. For example, the wideband preset index 0 and the wideband offset 0 represent the wideband NB0~NB3, the wideband preset index 1 and the wideband offset 0 represent the wideband NB4~NB7, and the wideband preset index 0 and the wideband offset 1 represent the wideband NB1~NB4. The meaning of the wideband offset domain is shown in Table 1.

TABLE 1

| Wideband offset domain | Meaning |
| --- | --- |
| 0 | No offset |
| 1 | Offset of 1 narrowband |

Specific Embodiment 5

Assuming that the PDSCH/PUSCH transmission supports a larger channel bandwidth (i.e., wideband), and assuming that the bandwidth of the wideband is 5 MHz, the basic unit of the wideband is RB, and the widebands do not overlap with each other. The basic unit of the wideband offset is RB and the specific number of the wideband offset is 12 RBs. The preset RB corresponding to the wideband offset is the RB0. The wideband indication is determined according to the wideband preset index and the wideband offset. Assuming that the system bandwidth is 10 MHz, the wideband preset index is determined in a manner with the system bandwidth of 10 MHz shown in the specific embodiment 2, as shown in FIG. 15. FIG. 15 is a schematic diagram 2 of a wideband preset index according to an embodiment of the present disclosure.

The base station sends the wideband indication to the terminal through the high-layer signaling and/or the DCI. The wideband preset index occupies 1 bit to perform the indication, and the wideband offset occupies 1 bit to perform the indication. For example, the wideband preset index 0 and the wideband offset 00 represent the wideband RB0~RB24, the wideband preset index 1 and the wideband offset 00 represent the wideband RB25~RB49, and the wideband preset index 0 and the wideband offset 10 represent the wideband RB12~RB36. The meaning of the wideband offset domain is shown in Table 2.

TABLE 2

| Wideband offset domain | Meaning |
| --- | --- |
| 00 | No offset |
| 01 | Offset of 1/4 wideband |
| 10 | Offset of 1/2 wideband |
| 11 | Offset of 3/4 wideband |

Specific Embodiment 6

Assuming that the PDSCH/PUSCH transmission supports a larger channel bandwidth (i.e., wideband), and assuming that the bandwidth of the wideband is 5 MHz, the basic unit of the wideband is narrowband, the widebands do not overlap with each other, and the wideband indication is determined according to the wideband preset index.

Specific Embodiment 6-1

In a case where the system bandwidth is 5 MHz, the wideband division is as shown in FIG. 7. There is one wideband, that is, the wideband NB0~NB3; and the wideband does not need to be indicate by the wideband indication. FIG. 7 is a schematic diagram of wideband division with a system bandwidth of 5 MHz according to an embodiment of the present disclosure.

Specific Embodiment 6-2

In a case where the system bandwidth is 10 MHz, the wideband division is as shown in FIG. 8. There are two widebands, that is, the wideband NB0~NB3 and the wideband NB4~NB7. FIG. 8 is a schematic diagram 1 of wideband division with a system bandwidth of 10 MHz according to an embodiment of the present disclosure.

The base station sends the wideband indication to the terminal through the high-layer signaling and/or the DCI. The wideband indication is determined according to the narrowband index. The narrowband index is the narrowband index corresponding to the starting narrowband of the wideband. That is, the wideband indication '0' represents the wideband when the narrowband index corresponding to the starting narrowband is NB0, and the wideband indication '1' represents the wideband when the narrowband index corresponding to the starting narrowband is NB4.

Specific Embodiment 6-3

In a case where the system bandwidth is 15 MHz, the wideband division is as shown in FIG. 9. There are three widebands, that is, the wideband NB0~NB3, the wideband NB4~NB7 and the wideband NB8~NB11. FIG. 9 is a schematic diagram of wideband division with a system bandwidth of 15 MHz according to an embodiment of the present disclosure.

The base station sends the wideband indication to the terminal through the high-layer signaling and/or the DCI. The wideband indication is determined according to the narrowband index. The narrowband index is the narrowband index corresponding to the starting narrowband of the wideband. That is, the wideband indication '00' represents the wideband when the narrowband index corresponding to the starting narrowband is NB0, the wideband indication '01' represents the wideband when the narrowband index corresponding to the starting narrowband is NB4, and the wideband indication '10' represents the wideband when the narrowband index corresponding to the starting narrowband is NB8.

Specific Embodiment 6-4

In a case where the system bandwidth is 20 MHz, the wideband division is as shown in FIG. 10. There are four widebands, that is, the wideband NB0~NB3, the wideband NB4~NB7, the wideband NB8~NB11 and the wideband NB12~NB15. FIG. 10 is a schematic diagram of wideband division with a system bandwidth of 20 MHz according to an embodiment of the present disclosure.

The base station sends the wideband indication to the terminal through the high-layer signaling and/or the DCI. The wideband indication is determined according to the narrowband index. The narrowband index is the narrowband index corresponding to the starting narrowband of the wideband. That is, the wideband indication '00' represents the wideband when the narrowband index corresponding to the starting narrowband is NB0, the wideband indication '01' represents the wideband when the narrowband index corresponding to the starting narrowband is NB4, the wideband indication '10' represents the wideband when the narrowband index corresponding to the starting narrowband is NB8, and the wideband indication '11' represents the wideband when the narrowband index corresponding to the starting narrowband is NB12.

Specific Embodiment 7

Assuming that the PDSCH/PUSCH transmission supports a larger channel bandwidth (i.e., wideband), and assuming that the bandwidth of the wideband is 5 MHz, the basic unit of the wideband is narrowband, the widebands overlap with each other, and the wideband indication is determined according to the wideband preset index.

Specific Embodiment 7-1

In a case where the system bandwidth is 10 MHz, the wideband division is as shown in FIG. 12. There are five widebands, that is, the wideband NB0~NB3, the wideband NB1~NB4, the wideband NB2~NB5, the wideband NB3~NB6 and the wideband NB4~NB7. FIG. 12 is a schematic diagram 3 of wideband division with a system bandwidth of 10 MHz according to an embodiment of the present disclosure.

The base station sends the wideband indication to the terminal through the high-layer signaling and/or the DCI. The wideband indication is determined according to the narrowband index. The narrowband index is the narrowband index corresponding to the starting narrowband of the wideband. That is, the wideband indication '000' represents the wideband when the narrowband index corresponding to the starting narrowband is NB0, the wideband indication '001' represents the wideband when the narrowband index corresponding to the starting narrowband is NB1, the wideband indication '010' represents the wideband when the narrowband index corresponding to the starting narrowband is NB2, the wideband indication '011' represents the wideband when the narrowband index corresponding to the starting narrowband is NB3, and the wideband indication '100' represents the wideband when the narrowband index corresponding to the starting narrowband is NB4.

Specific Embodiment 7-2

In a case where the system bandwidth is 10 MHz, the wideband division is as shown in FIG. 13. There are widebands, that is, the wideband N0~NB3, the wideband NB2~NB5 and the wideband NB4~NB7. FIG. 13 is a schematic diagram 4 of wideband division with a system bandwidth of 10 MHz according to an embodiment of the present disclosure.

The base station sends the wideband indication to the terminal through the high-layer signaling and/or the DCI. The wideband indication is determined according to the narrowband index. The narrowband index is the narrowband index corresponding to the starting narrowband of the wideband. That is, the wideband indication '00' represents the wideband when the narrowband index corresponding to the starting narrowband is NB0, the wideband indication '01' represents the wideband when the narrowband index corresponding to the starting narrowband is NB2, and the wideband indication '10' represents the wideband when the narrowband index corresponding to the starting narrowband is NB4.

Specific Embodiment 8

Assuming that the PDSCH/PUSCH transmission supports a larger channel bandwidth (i.e., wideband), and assuming that the bandwidth of the wideband is 5 MHz, the basic unit of the wideband is narrowband, and the system bandwidth is 5 MHz, as shown in FIG. 7.

Case 1: the resource allocation in the wideband is determined according to the narrowband enabling in the narrowband and the RB set in the narrowband;
the base station sends the resource location in the wideband to the terminal through the DCI; and
the resource location in the wideband occupies y1+y2 bits to perform the indication.

The y1 bits indicate the narrowband enabling state. Since four narrowbands exist, y1 is 4. Each bit in the narrowband enabling state represents one narrowband. For each bit, '0' represents that the data is not transmitted on the narrowband, and '1' represents that the data is transmitted on the narrowband. The narrowband enabling state '0001' represents that the data is transmitted on the narrowband 0. The narrowband enabling state '0010' represents that the data is transmitted on the narrowband 1. The narrowband enabling state '0100' represents that the data is transmitted on the narrowband 2. The narrowband enabling state '1000' represents that the data is transmitted on the narrowband 3. The narrowband enabling state '1111' represents that the data is transmitted on the narrowband 0, the narrowband 1, the narrowband 2 and the narrowband 3. Assuming that the first narrowband of the four narrowbands must be scheduled, that is, only 3 bits are used to indicate the last three narrowbands, at this point, y1=3.

The RB set in the narrowband is indicated by y2 bits, and the resource allocation in the narrowband in the existing technology is used, that is, y2=5. At this point, the resource location in the wideband is indicated by 8 bits. The RB set allocated in each narrowband is the same. The RB set in the narrowband may also take RBG as the basic unit, and for example, assuming three PRBs constitute one RBG, y2=2. At this point, the resource location in the wideband is indicated by 5 bits. When the state of y1 bits is '000', y2 bits represent the resource allocation in the first narrowband (that is, the narrowband indicated by the narrowband index) in the wideband. Or, when the state of y2 bits is '00', y1 bits represent the resource allocation in the first narrowband (that is, the narrowband indicated by the narrowband index) in the wideband.

Case 2: the resource allocation in the wideband is determined according to the narrowband set in the wideband and the RB set in the narrowband;
the base station sends the resource location in the wideband to the terminal through the DCI. The resource location in the wideband is indicated by y3+y2 bits, and the y3 bits indicate the narrowband set in the wideband, as shown in Table 3.

TABLE 3

| Value of y3 | Narrowband set |
| --- | --- |
| 0000 | Narrowband 0 |
| 0001 | Narrowband 1 |
| 0010 | Narrowband 2 |
| 0011 | Narrowband 3 |
| 0100 | Narrowbands 0 and 1 |
| 0101 | Narrowbands 1 and 2 |
| 0110 | Narrowbands 2 and 3 |
| 0111 | Narrowbands 0, 1 and 2 |
| 1000 | Narrowbands 1, 2 and 3 |
| 1001 | Narrowbands 0, 1, 2 and 3 |

The RB set in the narrowband is indicated by y2 bits, the resource allocation in the narrowband in the existing technology is used, that is, y2=5, and the RB set allocated in each narrowband is the same.

Case 3: the resource allocation in the wideband is determined according to the RB set in the wideband and the RB group set in the narrowband; the base station sends the resource location in the wideband to the terminal through the DCI; and
the resource location in the wideband is indicated by M bits. In the number $2^M$ of states corresponding to the M bits, m1 states indicate the RB set in the wideband, and m2 states indicate the RB group set in the wideband, where the RB set in the wideband refers to the RB set in the narrowband indicated by the narrowband index, and $m1+m2<=2^M$. The table below takes M being equal to 5 as an example, that is, a total of 32 states. Assuming that 21 states represent the RB set in the narrowband, and 11 states represent the RB group set in the wideband, the example is shown in Tables 4-1.

TABLE 4-1-1

| Value of M | RB set and RB group set |
| --- | --- |
| 00000 | RB0 |
| 00001 | RB1 |
| 00010 | RB2 |
| 00011 | RB3 |
| 00100 | RB4 |
| 00101 | RB5 |
| 00110 | RB0 and RB1 |
| 00111 | RB1 and RB2 |
| 01000 | RB2 and RB3 |
| 01001 | RB3 and RB4 |
| 01010 | RB4 and RB5 |
| 01011 | RB0, RB1 and RB2 |
| 01100 | RB1, RB2 and RB3 |
| 01101 | RB2, RB3 and RB4 |

TABLE 4-1-1-continued

| Value of M | RB set and RB group set |
|---|---|
| 01110 | RB3, RB4 and RB5 |
| 01111 | RB0, RB1, RB2 and RB3 |
| 10000 | RB1, RB2, RB3 and RB4 |
| 10001 | RB2, RB3, RB4 and RB5 |
| 10010 | RB0, RB1, RB2, RB3 and RB4 |
| 10011 | RB1, RB2, RB3, RB4 and RB5 |
| 10100 | RB0, RB1, RB2, RB3, RB4, RB5 and RB6 |
| 10101 | RBG0, RBG1 and RBG2 |
| 10110 | RBG0, RBG1, RBG2 and RBG3 |
| 10111 | RBG0, RBG1, RBG2, RBG3 and RBG4 |
| 11000 | RBG0, RBG1, RBG2, RBG3, RBG4 and RBG5 |
| 11001 | RBG0, RBG1, RBG2, RBG3, RBG4, RBG5 and RBG6 |
| 11010 | RBG0, RBG1, RBG2, RBG3, RBG4, RBG5, RBG6 and RBG7 |
| 11011 | RBG0 and RBG2 |
| 11100 | RBG1 and RBG3 |
| 11101 | RBG0, RBG2 and RBG4 |
| 11110 | RBG0, RBG2, RBG4 and RBG6 |
| 11111 | RBG0, RBG1, RBG4 and RBG5 |

TABLE 4-1-2

| Value of M | RB set and RB group set |
|---|---|
| 00000 | RB0 |
| 00001 | RB1 |
| 00010 | RB2 |
| 00011 | RB3 |
| 00100 | RB4 |
| 00101 | RB5 |
| 00110 | RB0 and RB1 |
| 00111 | RB1 and RB2 |
| 01000 | RB2 and RB3 |
| 01001 | RB3 and RB4 |
| 01010 | RB4 and RB5 |
| 01011 | RB0, RB1 and RB2 |
| 01100 | RB1, RB2 and RB3 |
| 01101 | RB2, RB3 and RB4 |
| 01110 | RB3, RB4 and RB5 |
| 01111 | RB0, RB1, RB2 and RB3 |
| 10000 | RB1, RB2, RB3 and RB4 |
| 10001 | RB2, RB3, RB4 and RB5 |
| 10010 | RB0, RB1, RB2, RB3 and RB4 |
| 10011 | RB1, RB2, RB3, RB4 and RB5 |
| 10100 | RB0, RB1, RB2, RB3, RB4, RB5 and RB6 |
| 10101 | RBG0, RBG1 and RBG2 |
| 10110 | RBG0, RBG1, RBG2 and RBG3 |
| 10111 | RBG0, RBG1, RBG2, RBG3 and RBG4 |
| 11000 | RBG0, RBG1, RBG4, RBG5, RBG6 and RBG7 |
| 11001 | RBG0, RBG1, RBG2, RBG3, RBG4, RBG5 and RBG6 |
| 11010 | RBG0, RBG1, RBG2, RBG3, RBG4, RBG5, RBG6 and RBG7 |
| 11011 | RBG0 and RBG2 |
| 11100 | RBG1 and RBG3 |
| 11101 | RBG0, RBG2 and RBG4 |
| 11110 | RBG0, RBG2, RBG4 and RBG6 |
| 11111 | RBG0, RBG1, RBG4 and RBG5 |

States of all RB sets in the narrowband may also be compressed, and more states are used to represent the RB group set in the wideband. The Table 4-2 takes the number of RBs corresponding to the RB set supportable to be compressed as an example. The number of RBs in the compressed RB set is 6, that is, the resource allocation corresponding to the state '10100' is changed from {RB0, RB1, RB2, RB3, RB4, RB5} into {RBG0, RBG4}.

TABLE 4-2

| Value of M | RB set and RB group enabling |
|---|---|
| 00000 | RB0 |
| 00001 | RB1 |
| 00010 | RB2 |
| 00011 | RB3 |
| 00100 | RB4 |
| 00101 | RB5 |
| 00110 | RB0 and RB1 |
| 00111 | RB1 and RB2 |
| 01000 | RB2 and RB3 |
| 01001 | RB3 and RB4 |
| 01010 | RB4 and RB5 |
| 01011 | RB0, RB1 and RB2 |
| 01100 | RB1, RB2 and RB3 |
| 01101 | RB2, RB3 and RB4 |
| 01110 | RB3, RB4 and RB5 |
| 01111 | RB0, RB1, RB2 and RB3 |
| 10000 | RB1, RB2, RB3 and RB4 |
| 10001 | RB2, RB3, RB4 and RB5 |
| 10010 | RB0, RB1, RB2, RB3 and RB4 |
| 10011 | RB1, RB2, RB3, RB4 and RB5 |
| 10100 | RBG0 and RBG4 |
| 10101 | RBG0, RBG1 and RBG2 |
| 10110 | RBG0, RBG1, RBG2 and RBG3 |
| 10111 | RBG0, RBG1, RBG2, RBG3 and RBG4 |
| 11000 | RBG0, RBG1, RBG2, RBG3, RBG4 and RBG5 |
| 11001 | RBG0, RBG1, RBG2, RBG3, RBG4, RBG5 and RBG6 |
| 11010 | RBG0, RBG1, RBG2, RBG3, RBG4, RBG5, RBG6 and RBG7 |
| 11011 | RBG0 and RBG2 |
| 11100 | RBG1 and RBG3 |
| 11101 | RBG0, RBG2 and RBG4 |
| 11110 | RBG0, RBG2, RBG4 and RBG6 |
| 11111 | RBG0, RBG1, RBG4 and RBG5 |

The Table 4-3 takes the number of RBs corresponding to the RB set supportable to be compressed as an example. The number of RBs in the compressed RB set is 3, that is, the resource allocation corresponding to the state '01101' is changed from {RB2, RB3, RB4} into {RBG0, RBG4}, and the resource allocation corresponding to the state '01110' is changed from {RB3, RB4, RB5} into {RBG0, RBG6}.

TABLE 4-3

| Value of M | RB set and RB group set |
|---|---|
| 00000 | RB0 |
| 00001 | RB1 |
| 00010 | RB2 |
| 00011 | RB3 |
| 00100 | RB4 |
| 00101 | RB5 |
| 00110 | RB0 and RB1 |
| 00111 | RB1 and RB2 |
| 01000 | RB2 and RB3 |
| 01001 | RB3 and RB4 |
| 01010 | RB4 and RB5 |
| 01011 | RB0, RB1 and RB2 |
| 01100 | RB1, RB2 and RB3 |
| 01101 | RBG0 and RBG4 |
| 01110 | RBG0 and RBG6 |
| 01111 | RB0, RB1, RB2 and RB3 |
| 10000 | RB1, RB2, RB3 and RB4 |
| 10001 | RB2, RB3, RB4 and RB5 |
| 10010 | RB0, RB1, RB2, RB3 and RB4 |
| 10011 | RB1, RB2, RB3, RB4 and RB5 |
| 10100 | RBG0 and RBG4 |
| 10101 | RBG0, RBG1 and RBG2 |
| 10110 | RBG0, RBG1 and RBG2, RBG3 |
| 10111 | RBG0, RBG1, RBG2, RBG3 and RBG4 |
| 11000 | RBG0, RBG1, RBG2, RBG3, |

TABLE 4-3-continued

| Value of M | RB set and RB group set |
|---|---|
| | RBG4 and RBG5 |
| 11001 | RBG0, RBG1, RBG2, RBG3, RBG4, RBG5 and RBG6 |
| 11010 | RBG0, RBG1, RBG2, RBG3, RBG4, RBG5, RBG6 and RBG7 |
| 11011 | RBG0 and RBG2 |
| 11100 | RBG1 and RBG3 |
| 11101 | RBG0, RBG2 and RBG4 |
| 11110 | RBG0, RBG2, RBG4 and RBG6 |
| 11111 | RBG0, RBG1, RBG4 and RBG5 |

Specific Embodiment 9

Assuming that the PDSCH/PUSCH transmission supports a larger channel bandwidth (i.e., wideband), and assuming that the bandwidth of the wideband is 5 MHz, the basic unit of the wideband is narrowband, and the system bandwidth is 10 MHz, as shown in FIG. 6, the wideband indication is assumed to be 0.

The resource allocation in the wideband is assumed to be determined through the RB set in the wideband. The y4 bits indicate the RB set. For example, '000000000' represents RBG0, and '000001001' represents RBG0 and RBG1. The specific RB set is the existing technology, which will not be described herein. When the wideband is 5 MHz, 9 bits are needed to indicate all possible RB sets.

Specific Embodiment 10

The bandwidth of the larger PDSCH/PUSCH channel, that is, the bandwidth of the wideband, is 5 MHz, the basic unit of the wideband is RB, the system bandwidth is 5 MHz, and the number of RBs in the RB group is fixed to be 3.

Case 1: the resource allocation in the wideband is determined through the RB group set in the wideband. Since the wideband is 25 PRBs, and the number of RBs in the RB group is fixed to be 3, 9 RB groups exist, and the number of all RB group sets are 45, indicated by y5=6 bits. For example, '000000' represents the RB group 0, and '001001' represents the RB groups 0 and 1.

Case 2: the resource allocation in the wideband is determined through the RB group enabling in the wideband. Since the wideband is 25 PRBs, and the number of RBs in the RB group is fixed to be 3, 9 RB groups exist, and the RB group enabling is indicated by y6=9 bits. Each bit in the RB group enabling state represents one RB group. For example, '0' represents that the data is not transmitted on the RB group and '1' represent that the data is transmitted in the RB group.

The number of RBs in the RB group is p. The value of p may be determined according to the number of RBs included in the wideband, or may be determined according to the number of RBs included in the system bandwidth. The specific number of RBs is shown in Table 5.

TABLE 5

| Number of RBs | (p) |
|---|---|
| ≤10 | 1 |
| 11-26 | 2 |
| 27-63 | 3 |
| 64-110 | 4 |

Specific Embodiment 11

It is assumed that the BL UE with the reception bandwidth of 5 MHz works in the CE mode A with a maximum PDSCH channel bandwidth of 5 MHz. The UE receives the resource allocation parameter in the DCI and receives the PDSCH according to the resource allocation parameter. The resource allocation in the wideband is determined according to the parameter narrowband index and the resource location in the wideband. It is assumed that the resource allocation overhead is not limited to the resource allocation overhead of the existing narrowband, where the resource location in the wideband is determined according to the narrowband enabling and the RB set in the narrowband.

When the system bandwidth is 5 MHz, the resource allocation is composed of 4-bit narrowband enabling state and 5-bit RB set in the narrowband; and/or when the system bandwidth is 10 MHz, the resource allocation is composed of 3-bit narrowband index, 3-bit narrowband enabling state and 5-bit RB set in the narrowband; and/or when the system bandwidth is 15 MHz/20 MHz, the resource allocation is composed of 4-bit narrowband index, 3-bit narrowband enabling state and 5-bit RB set in the narrowband; and/or when the system bandwidth is greater than 5 MHz, the 3-bit narrowband enabling state indicates the enabling states of the second, third and fourth narrowbands, and the RB set in the narrowband uses the existing manner of the resource allocation in the narrowband.

Specific Embodiment 12

It is assumed that the BL UE with the reception bandwidth of 5 MHz works in the CE mode A with a maximum PDSCH channel bandwidth of 5 MHz. The UE receives the resource allocation parameter in the DCI and receives the PDSCH according to the resource allocation parameter. The resource allocation in the wideband is determined according to the parameter narrowband index and the resource location in the wideband. It is assumed that the resource allocation overhead is limited to the resource allocation overhead of the existing narrowband, where the resource location in the wideband is determined according to the narrowband enabling and the RB set in the narrowband.

When the system bandwidth is 5 MHz, the resource allocation is composed of 4-bit narrowband enabling state and 2-bit RB set in the narrowband; and/or when the system bandwidth is 10 MHz, the resource allocation is composed of 3-bit narrowband index, 3-bit narrowband enabling state and 2-bit RB set in the narrowband; and/or when the system bandwidth is 15 MHz/20 MHz, the resource allocation is composed of 4-bit narrowband index, 3-bit narrowband enabling state and 2-bit RB set in the narrowband; and/or when the RB set in the narrowband includes two RBGs by dividing RBs in the narrowband into groups of three RBs, each bit indicates the state of one of two RBGs. When the 3-bit narrowband enabling state is '000', 2-bit resource allocation in the narrowband represents the resource allocation in the first narrowband. Or when the 2-bit resource allocation in the narrowband is '00', 3 bits are used for representing the resource allocation in the first narrowband.

Specific Embodiment 13

It is assumed that the BL UE with the reception bandwidth of 5 MHz works in the CE mode A with a maximum PDSCH channel bandwidth of 5 MHz. The UE receives the resource allocation parameter in the DCI and receives the PDSCH according to the resource allocation parameter. The resource allocation in the wideband is determined according to the parameter narrowband index and the resource location in the wideband. It is assumed that the resource allocation overhead is limited to the resource allocation overhead of the existing narrowband.

When the system bandwidth is 5 MHz, the resource allocation is composed of 2-bit narrowband index and 5-bit RB set and RB group set in the wideband; and/or
when the system bandwidth is 10 MHz, the resource allocation is composed of 3-bit narrowband index and 5-bit RB set and RB group set in the wideband; and/or
when the system bandwidth is 15 MHz/20 MHz, the resource allocation is composed of 4-bit narrowband index and 5-bit RB set and RB group set in the wideband. The RB set in the wideband refers to the RB set in the narrowband indicated by the narrowband index. The specific meaning of the 5-bit is shown in the Table 4.

Specific Embodiment 14

It is assumed that the BL UE with the reception bandwidth of 5 MHz works in the CE mode A with a maximum PUSCH channel bandwidth of 5 MHz. The UE receives the resource allocation parameter in the DCI and sends the PUSCH according to the resource allocation parameter. The resource allocation is determined according to the resource location. It is assumed that the resource allocation overhead is limited to the resource allocation overhead of the existing narrowband.

When the system bandwidth is 5 MHz, the resource allocation is composed of 2-bit narrowband index and 5-bit resource start and resource end in the wideband; and/or
when the system bandwidth is 10 MHz, the resource allocation is composed of 3-bit narrowband index and 5-bit resource start and resource end in the wideband; and/or
when the system bandwidth is 15 MHz/20 MHz, the resource allocation is composed of 4-bit narrowband index and 5-bit resource start and resource end in the wideband.

The resource start and resource end in the wideband have 32 states in Table 6 predefined by the base station and the terminal. In an example, the first 32 states are selected and indicated by 5 bits.

TABLE 6

| State | Resource start | Resource end |
|---|---|---|
| 1 | RBG1 | RBG1 |
| 2 | RBG1 | RBG2 |
| 3 | RBG1 | RBG3 |
| 4 | RBG1 | RBG4 |
| 5 | RBG1 | RBG5 |
| 6 | RBG1 | RBG6 |
| 7 | RBG1 | RBG7 |
| 8 | RBG1 | RBG8 |
| 9 | RBG2 | RBG2 |
| 10 | RBG2 | RBG3 |
| 11 | RBG2 | RBG4 |
| 12 | RBG2 | RBG5 |
| 13 | RBG2 | RBG6 |
| 14 | RBG2 | RBG7 |
| 15 | RBG2 | RBG8 |
| 16 | RBG3 | RBG3 |
| 17 | RBG3 | RBG4 |
| 18 | RBG3 | RBG5 |
| 19 | RBG3 | RBG6 |
| 20 | RBG3 | RBG7 |

TABLE 6-continued

| State | Resource start | Resource end |
|---|---|---|
| 21 | RBG3 | RBG8 |
| 22 | RBG4 | RBG4 |
| 23 | RBG4 | RBG5 |
| 24 | RBG4 | RBG6 |
| 25 | RBG4 | RBG7 |
| 26 | RBG4 | RBG8 |
| 27 | RBG5 | RBG5 |
| 28 | RBG5 | RBG6 |
| 29 | RBG5 | RBG7 |
| 30 | RBG5 | RBG8 |
| 31 | RBG6 | RBG6 |
| 32 | RBG6 | RBG7 |
| 33 | RBG6 | RBG8 |
| 34 | RBG7 | RBG7 |
| 35 | RBG7 | RBG8 |
| 36 | RBG8 | RBG8 |

Specific Embodiment 15

It is assumed that the BL UE with the reception bandwidth of 5 MHz works in the CE mode A with a maximum PUSCH channel bandwidth of 5 MHz. The UE receives the resource allocation parameter in the DCI and sends the PUSCH according to the resource allocation parameter. The resource allocation is determined according to the resource location. It is assumed that the resource allocation overhead is limited to the resource allocation overhead of the existing narrowband.

When the system bandwidth is 5 MHz, the resource allocation is composed of 2-bit narrowband index and 5-bit RB set and RB group set in the wideband; and/or
when the system bandwidth is 10 MHz, the resource allocation is composed of 3-bit narrowband index and 5-bit RB set and RB group set in the wideband; and/or
when the system bandwidth is 15 MHz/20 MHz, the resource allocation is composed of 4-bit narrowband index and 5-bit RB set and RB group set in the wideband.

The RB set in the narrowband refers to the RB set in the narrowband indicated by the narrowband index. The meaning of the 5-bit RB set and RB group set in the wideband is shown in Table 7-1.

TABLE 7-1

| Value of M | RB set and RB group set |
|---|---|
| 00000 | RB0 |
| 00001 | RB1 |
| 00010 | RB2 |
| 00011 | RB3 |
| 00100 | RB4 |
| 00101 | RB5 |
| 00110 | RB0 and RB1 |
| 00111 | RB1 and RB2 |
| 01000 | RB2 and RB3 |
| 01001 | RB3 and RB4 |
| 01010 | RB4 and RB5 |
| 01011 | RB2 and RB3 |
| 01100 | RB0, RB1 and RB2 |
| 01101 | RB1, RB2 and RB3 |
| 01110 | RB2, RB3 and RB4 |
| 01111 | RB3, RB4 and RB5 |
| 10000 | RB0, RB1, RB2 and RB3 |
| 10001 | RB1, RB2, RB3 and RB4 |
| 10010 | RB2, RB3, RB4 and RB5 |
| 10011 | RB0, RB1, RB2, RB3 and RB4 |
| 10100 | RB1, RB2, RB3, RB4 and RB5 |
| 10101 | RB0, RB1, RB2, RB3, RB4, RB5 and RB6 |

TABLE 7-1-continued

| Value of M | RB set and RB group set |
|---|---|
| 10110 | RBG0, RBG1 and RBG2 |
| 10111 | RBG0, RBG1, RBG2 and RBG3 |
| 11000 | RBG0, RBG1, RBG2, RBG3 and RBG4 |
| 11001 | RBG0, RBG1, RBG2, RBG3, RBG4 and RBG5 |
| 11010 | RBG0, RBG1, RBG2, RBG3, RBG4, RBG5 and RBG6 |
| 11011 | RBG0, RBG1, RBG2, RBG3, RBG4, RBG5, RBG6 and RBG7 |
| 11100 | RBG1 and RBG2 |
| 11101 | RBG1, RBG2 and RBG3 |
| 11110 | RBG1, RBG2, RBG3 and RBG4 |
| 11111 | RBG1, RBG2, RBG3, RBG4 and RBG5 |

Or, the meaning is shown in Table 7-2.

TABLE 7-2

| Value of M | RB set and RB group set |
|---|---|
| 00000 | RB0 |
| 00001 | RB1 |
| 00010 | RB2 |
| 00011 | RB3 |
| 00100 | RB4 |
| 00101 | RB5 |
| 00110 | RB0 and RB1 |
| 00111 | RB1 and RB2 |
| 01000 | RB2 and RB3 |
| 01001 | RB3 and RB4 |
| 01010 | RB4 and RB5 |
| 01011 | RB2 and RB3 |
| 01100 | RB0, RB1 and RB2 |
| 01101 | RB1, RB2 and RB3 |
| 01110 | RB2, RB3 and RB4 |
| 01111 | RB3, RB4 and RB5 |
| 10000 | RB0, RB1, RB2 and RB3 |
| 10001 | RB1, RB2, RB3 and RB4 |
| 10010 | RB2, RB3, RB4 and RB5 |
| 10011 | RB0, RB1, RB2, RB3 and RB4 |
| 10100 | RB1, RB2, RB3, RB4 and RB5 |
| 10101 | RB0, RB1, RB2, RB3, RB4, RB5 and RB6 |
| 10110 | RBG0, RBG1 and RBG2 |
| 10111 | RBG0, RBG1, RBG2 and RBG3 |
| 11000 | RBG0, RBG1, RBG2, RBG3 and RBG4 |
| 11001 | RBG0, RBG1, RBG2, RBG3, RBG4 and RBG5 |
| 11010 | RBG0, RBG1, RBG2, RBG3, RBG4, RBG5 and RBG6 |
| 11011 | RBG0, RBG1, RBG2, RBG3, RBG4, RBG5, RBG6 and RBG7 |
| 11100 | RBG1 and RBG2 |
| 11101~11111 | Reserved |

Specific Embodiment 16

It is assumed that the BL UE with the reception bandwidth of 5 MHz works in the CE mode A with a maximum PUSCH channel bandwidth of 5 MHz. The UE receives the resource allocation parameter in the DCI and sends the PUSCH according to the resource allocation parameter. The resource allocation is determined according to the resource location.

The resource location includes the resource starting RB and the resource ending RB. It is assumed that the resource allocation overhead is not limited to the resource allocation overhead of the existing narrowband.

When the system bandwidth is 5 MHz, the resource allocation is obtained through joint coding of 9-bit resource starting RB and resource ending RB; and/or when the system bandwidth is 10 MHz, the resource allocation is obtained through joint coding of 10-bit resource starting RB and resource ending RB; and/or when the system bandwidth is 15 MHz, the resource allocation is obtained through joint coding of 11-bit resource starting RB and resource ending RB; and/or when the system bandwidth is 20 MHz, the resource allocation is obtained through joint coding of 12-bit resource starting RB and resource ending RB.

The resource starting RB and resource ending RB are obtained through a pre-defined table, using the system bandwidth being 10 MHz as an example.

TABLE 8 resource allocation when system bandwidth is 10 MHz

| State | Starting RB | Ending RB |
|---|---|---|
| 1~25 | 1 | 1~25 |
| 26~50 | 2 | 2~26 |
| 51~75 | 3 | 3~27 |
| 76~100 | 4 | 4~28 |
| 101~125 | 5 | 5~29 |
| 126~150 | 6 | 6~30 |
| 151~175 | 7 | 7~31 |
| 176~200 | 8 | 8~32 |
| 201~225 | 9 | 9~33 |
| 226~250 | 10 | 10~34 |
| 251~275 | 11 | 11~35 |
| 275~300 | 12 | 12~36 |
| 301~325 | 13 | 13~37 |
| 326~350 | 14 | 14~38 |
| 351~375 | 15 | 15~39 |
| 376~400 | 16 | 16~40 |
| 401~425 | 17 | 17~41 |
| 426~450 | 18 | 18~42 |
| 451~475 | 19 | 19~43 |
| 476~500 | 20 | 20~44 |
| 501~525 | 21 | 21~45 |
| 526~550 | 22 | 22~46 |
| 551~575 | 23 | 23~47 |
| 576~600 | 24 | 24~48 |
| 601~625 | 25 | 25~49 |
| 626~650 | 26 | 26~50 |
| 651~674 | 27 | 27~50 |
| 675~697 | 28 | 28~50 |
| 698~719 | 29 | 29~50 |
| 720~740 | 30 | 30~50 |
| 741~760 | 31 | 31~50 |
| 761~779 | 32 | 32~50 |
| 780~797 | 33 | 33~50 |
| 798~814 | 34 | 34~50 |
| 815~830 | 35 | 35~50 |
| 831~845 | 36 | 36~50 |
| 846~859 | 37 | 37~50 |
| 860~872 | 38 | 38~50 |
| 873~884 | 39 | 39~50 |
| 885~895 | 40 | 40~50 |
| 896~905 | 41 | 41~50 |
| 906~914 | 42 | 42~50 |
| 915~922 | 43 | 43~50 |
| 923~929 | 44 | 44~50 |
| 930~935 | 45 | 45~50 |
| 936~940 | 46 | 46~50 |
| 941~944 | 47 | 47~50 |
| 945~947 | 48 | 48~50 |
| 948~949 | 49 | 49~50 |
| 950 | 50 | 50 |

Specific Embodiment 17

It is assumed that the BL UE with the reception bandwidth of 5 MHz works in the CE mode A with a maximum PUSCH channel bandwidth of 5 MHz. The UE receives the resource allocation parameter in the DCI and sends the PUSCH according to the resource allocation parameter. The resource allocation is determined according to the resource location. The resource location includes the resource starting RB and the number of resources. It is assumed that the resource allocation overhead is not limited to the resource allocation overhead of the existing narrowband.

The resource starting RB and the number of resources are obtained through the resource indication value (RIV). The RIV is defined as:

if $(L_{CRBs}-1) \leq \lfloor N_{RB}^{UL}/2 \rfloor$, then $RIV = N_{RB}^{UL}(L_{CRBs}-1) + RB_{START}$, or $RIV = N_{RB}^{UL}(N_{RB}^{UL} - L_{CRBs}+1) + (N_{RB}^{UL}-1-RB_{START})$ In the formula, $N_{RB}^{UL}$ is the number of RBs occupied by the system, $RB_{START}$ is the resource starting RB, and $L_{CRBs}$ is the number of resources, that is, the number of RBs.

When the system bandwidth is 5 MHz, and the maximum value of the RIV is 325, 9 bits are needed for indication; and/or
when the system bandwidth is 10 MHz, and the maximum value of the RIV is 1250, 11 bits are needed for indication; and/or
when the system bandwidth is 15 MHz, and the maximum value of the RIV is 1875, 11 bits are needed for indication; and/or
when the system bandwidth is 20 MHz, and the maximum value of the RIV is 2500, 12 bits are needed for indication.

In specific embodiments 14 and 15, the resource granularity may be RB or RBG, so as to further reduce the resource allocation overhead, and specific examples about that will not be described herein.

Specific Embodiment 18

It is assumed that the non-BL UE works in the CE mode A with a maximum PDSCH/PUSCH channel bandwidth of 5 MHz. The UE receives the resource allocation parameter in the DCI and sends the PDSCH/PUSCH according to the resource allocation parameter.

The specific resource allocation parameter in this specific embodiment is the same as the specific resource allocation parameter when the BL UE with the reception bandwidth of 5 MHz works in the CE mode A with a maximum PUSCH channel bandwidth of 5 MHz, which will not be described herein.

Specific Embodiment 19

It is assumed that the non-BL UE works in the CE mode A with a maximum PDSCH channel bandwidth of 20 MHz. The UE receives the resource allocation parameter in the DCI and receives the PDSCH according to the resource allocation parameter.

The manner of the resource allocation is the same as the manner of that in the existing LTE. The difference is the number of RBs included in the RBG. In an example of the system bandwidth of 20 MHz, if the resource allocation scheme type0 is adopted, the resource allocation overhead when it is assumed that the resource allocation overhead and the resource overhead when it is assumed that the channel bandwidth is 5 MHz are shown in the specific embodiment 11. At least 12 RBs are needed to form one RBG.

In another example, it is assumed that the resource allocation overhead is the same as the existing resource allocation overhead, and the RB set in the wideband and the RB group set in the wideband represent the resource allocation, where one RBG group includes six PRBs.

Specific Embodiment 20

It is assumed that the non-BL UE works in the CE mode A with a maximum PUSCH channel bandwidth of 20 MHz. The UE receives the resource allocation parameter in the DCI and sends the PUSCH according to the resource allocation parameter.

The manner of the resource allocation is the same as the manner in the existing LTE. The difference is that the resource granularity is limited by the resource overhead. In an example of the system bandwidth of 20 MHz, the resource allocation overhead when it is assumed that the resource allocation overhead and the channel bandwidth is 5 MHz and the resource allocation when it is assumed that the channel bandwidth is 5 MHz refer to the specific embodiment 15, and part of RBs are needed to form RBGs.

Specific Embodiment 21

It is assumed that the BL UE with the reception bandwidth of 5 MHz works in the CE mode B with the maximum PDSCH channel bandwidth of 5 MHz. Considering that the mode B mainly pursues large coverage, the overhead of the resource allocation domain is not increased, that is, the overhead of the resource allocation domain shown in Table 9.

TABLE 9

| System bandwidth | Overhead |
| --- | --- |
| 5 MHz | 3 |
| 10 MHz | 4 |
| 15 MHz/20 MHz | 5 |

The UE receives the resource allocation parameter in the DCI and receives the PDSCH according to the resource allocation parameter. The resource allocation is determined according to the wideband indication and the resource allocation in the wideband. The resource allocation in the wideband is composed of the narrowband enabling in the wideband and the RB set in the narrowband.

When the system bandwidth is 5 MHz, the resource allocation is composed of 3-bit narrowband enabling in the wideband; and/or
when the system bandwidth is 10 MHz, the resource allocation is composed of 1-bit wideband indication and 3-bit narrowband enabling in the wideband; and/or
when the system bandwidth is 15 MHz/20 MHz, the resource allocation is composed of 2-bit wideband indication and 3-bit narrowband enabling in the wideband.

The wideband indication may be the wideband preset index, or may be the pre-defined narrowband index. Since the first narrowband in the wideband is always configured, only 3 bits are occupied for indicting the narrowband enabling in the wideband.

In another example, the resource allocation in the wideband is composed of the resource start and the resource end in the wideband. Due to the limitation of the overhead of 3 bits, part of states is needed to be compressed. For example, {state 1, state 2, state 3, state 4, state 5, state 6, state 8, state 10} is selected. The Table 10 shows an example.

TABLE 10

| State | Starting narrowband | Ending narrowband |
|---|---|---|
| 1 | 1 | 1 |
| 2 | 1 | 2 |
| 3 | 1 | 3 |
| 4 | 1 | 4 |
| 5 | 2 | 2 |
| 6 | 2 | 3 |
| 7 | 2 | 4 |
| 8 | 3 | 3 |
| 9 | 3 | 4 |
| 10 | 4 | 4 |

Specific Embodiment 22

It is assumed that the BL UE with the reception bandwidth of 5 MHz works in the CE mode B with the maximum PDSCH channel bandwidth of 5 MHz. Considering that the mode B mainly pursues large coverage, the overhead of the resource allocation domain is not increased, that is, the overhead of the resource allocation domain shown in the Table 9.

The UE receives the resource allocation parameter in the DCI and receives the PDSCH according to the resource allocation parameter. The resource allocation is determined according to the resource location. The resource location includes the resource starting location and the number of resources.

When the system bandwidth is 5 MHz, the resource allocation is composed of 2-bit number of resources and 1-bit resource starting location; and/or
when the system bandwidth is 10 MHz, the resource allocation is composed of 2-bit number of resources and 2-bit resource starting location; and/or
when the system bandwidth is 15 MHz/20 MHz, the resource allocation is composed of 2-bit number of resources and 3-bit resource starting location.

The number of resources is allocated in the unit of narrowband/6 RBs, whose specific meaning is shown in Table 11.

TABLE 11

| Resource number domain | Meaning |
|---|---|
| 00 | 1 narrowband/6 RBs |
| 01 | 2 narrowbands/12 RBs |
| 10 | 3 narrowbands/18 RBs |
| 11 | 4 narrowbands/24 RBs/25 RBs |

The resource staring location is determined by the interval (of total number of narrowbands/number of states corresponding to indication starting location). For example, when the system bandwidth is 5 MHz, the total number of narrowbands is 4, and 1 bit, that is, 2 states, is occupied for indication. The interval of the starting location is 2 and the starting location is {narrowband 1, narrowband 3}.

Specific Embodiment 23

It is assumed that the non-BL UE works in the CE mode B with the maximum PDSCH channel bandwidth of 5 MHz.

The specific resource allocation parameter in this specific embodiment is the same as the specific resource allocation parameter when the BL UE with the reception bandwidth of 5 MHz works in the CE mode B with the maximum PDSCH channel bandwidth of 5 MHz, which will not be described herein.

Specific Embodiment 24

It is assumed that the non-BL UE works in the CE mode B with the maximum PDSCH channel bandwidth of 20 MHz. Considering that the mode B mainly pursues large coverage, the overhead of the resource allocation domain is not increased, that is, the overhead of the resource allocation domain shown in the Table 9.

The UE receives the resource allocation parameter in the DCI and receives the PDSCH according to the resource allocation parameter. The resource allocation is determined according to the resource location. The resource location includes the resource starting location and the resource ending location.

When the system bandwidth is 5 MHz, the resource allocation is composed of 3-bit resource starting location and resource ending location. The resource start and the resource end have the basic unit of narrowband. There are totally 4 narrowbands. That is, the following 10 states are needed to be indicated. As shown in the Table 8, since there are only 3 bits for indication, 8 states are selected. For example, {state 1, state 2, state 3, state 4, state 5, state 6, state 8, state 10} is selected.

When the system bandwidth is 10 MHz, the resource allocation is composed of 4-bit resource starting location and resource ending location. The resource start and resource end have the basic unit of narrowband. There are totally 8 narrowbands, that is, 36 states are needed to be indicated. Since there are only 4 bits, that is only 16 states are indicated, 16 states are selected from 36 states in the Table 10 by limiting the starting location, as shown in Table 12.

TABLE 12

| State | Starting narrowband | Ending narrowband |
|---|---|---|
| 1 | 1 | 1 |
| 2 | 1 | 2 |
| 3 | 1 | 3 |
| 4 | 1 | 4 |
| 5 | 1 | 5 |
| 6 | 1 | 6 |
| 7 | 1 | 7 |
| 8 | 1 | 8 |
| 9 | 3 | 3 |
| 10 | 3 | 4 |
| 11 | 5 | 5 |
| 12 | 5 | 6 |
| 13 | 5 | 7 |
| 14 | 5 | 8 |
| 15 | 7 | 7 |
| 16 | 7 | 8 |

That is, when the number of narrowbands is 1 or 2, the number of starting locations is limited to be 4, that is, narrowband 1, narrowband 3, narrowband 5 and narrowband 7. When the number of narrowbands is 3 or 4, the number of starting locations is limited to be 2, that is, narrowband 1 and narrowband 5. When the number of narrowbands is greater than 4, the number of starting locations is limited to be 1.

When the system bandwidth is 15 MHz, the resource allocation is composed of 5-bit resource starting location and resource ending location. The resource start and the resource end have the basic unit of narrowband. There are totally 12 narrowbands, that is, 78 states are needed to be indicated. Since there are only 5 bits, only 32 states can be indicated. 32 states are selected from 78 states by limiting the starting location. The selection manner is the same as the manner when the system bandwidth is 10 MHz. When the number of narrowbands is 1 or 2, the number of starting locations is limited to be 6, that is, narrowband 1, narrowband 3, narrowband 5, narrowband 7, narrowband 9 and narrowband 11. When the number of narrowbands is 3 or 4, the number of starting locations is limited to be 3, that is, narrowband 1, narrowband 3 and narrowband 9. When the number of narrowbands is 5 or 6, the number of starting locations is limited to be 2, that is, narrowband 1 and narrowband 7. When the number of narrowbands is greater than 6, the number of starting locations is limited to be 1, that is, narrowband 1.

When the system bandwidth is 20 MHz, the resource allocation is composed of 5-bit resource starting location and resource ending location. The resource start and the resource end have the basic unit of narrowband. There are totally 16 narrowbands, that is, 136 states are needed to be indicated. Since there are only 5 bits, only 32 states can be indicated. 32 states are selected from 136 states by limiting the starting location.

When the number of narrowbands is 1 or 2, the number of starting locations is limited to be 5, that is, narrowband 1, narrowband 5, narrowband 7, narrowband 11 and narrowband 13. When the number of narrowbands is 3 or 4, the number of starting locations is limited to be 3, that is, narrowband 1, narrowband 5 and narrowband 9. When the number of narrowbands is 5 or 6, the number of starting locations is limited to be 2, that is, narrowband 1 and narrowband 7. When the number of narrowbands is 7 or 8, the number of starting locations is limited to be 2, that is, narrowband 1 and narrowband 9. When the number of narrowbands is greater than 8, the number of starting locations is limited to be 1, that is, narrowband 1.

In the above embodiment, the number of narrowbands may have the granularity of one narrowband, or may have the granularity of narrowband group formed by k narrowbands, thereby reducing the limitation on the starting location. Limiting the starting location and/or limiting the allocation granularity are all ways to reduce the overhead.

When the system bandwidth is 5 MHz, the number of widebands may be indicated by x bits, and the resource allocation in the wideband is indicated by 3 bits. The resource allocation in the wideband may use the narrowband enabling state or joint code of the starting narrowband and the ending narrowband in the Table 10. The specific meaning of the number of widebands indicated by x bits is shown in Table 13.

TABLE 13

| | State of x bits | |
|---|---|---|
| System bandwidth is 10 MHz | 0 | Wideband 1 |
| | 1 | Wideband 1 and wideband 2 |
| System bandwidth is 15 MHz | 00 | Wideband 1 |
| | 01 | Wideband 1 and wideband 2 |
| | 10 | Wideband 1, wideband 2 and wideband 3 |
| | 11 | Reserved |
| System bandwidth is 20 MHz | 00 | Wideband 1 |
| | 01 | Wideband 1 and wideband 2 |
| | 10 | Wideband 1, wideband 2 |

TABLE 13-continued

| State of x bits | |
|---|---|
| | and wideband 3 |
| 11 | Wideband 1, wideband 2, wideband 3 and wideband 4 |

Specific Embodiment 25

It is assumed that the BL UE with the reception bandwidth of 5 MHz works in the CE mode B with a maximum PDSCH channel bandwidth of 5 MHz; and/or it is assumed that the non-BL UE with the reception bandwidth of 5 MHz works in the CE mode B with the maximum PDSCH channel bandwidth of 5 MHz; and/or it is assumed that the non-BL UE with the reception bandwidth of 5 MHz works in the CE mode B with the maximum PDSCH channel bandwidth of 20 MHz.

The resource allocation domain overhead is not limited to that shown in the Table 9. The resource allocation manner is the same as the manner in the CE mode A.

Specific Embodiment 26

The base station sends the wideband enabling subframe to the terminal through the high-layer signaling. It is assumed that 40 bits are used to perform indication, that is, a value '1' of a bit represents the subframe where the wideband is located.

Specific Embodiment 27

The base station indicates the wideband mode through the high-layer signaling. For example, '1' represents the wideband mode, and '0' represents the narrowband mode.

Specific Embodiment 28

In step 1601, the terminal determines a channel state information (CSI) reference resource.

In step 1602, CSI in the CSI reference resource is reported, where the CSI reference resource includes a CSI time domain reference resource and a CSI frequency domain reference resource.

In the step 1601, the CSI time domain reference resource is one or more subframes.

Preferably, the CSI frequency domain reference resource is one of:

when the PDSCH is transmitted on the CSI time domain reference resource, the CSI frequency domain reference resource is a wideband where the PDSCH is located; and assuming that the PDSCH is transmitted on the wideband 0, the CSI frequency domain resource is the wideband 0; or when only the physical downlink control channel (PDCCH) is transmitted on the CSI time domain reference resource, the CSI frequency domain reference resource is a narrowband where the PDCCH is located or the wideband where the PDCCH is located; and assuming that the wideband where the PDCCH is located is the wideband 0, the CSI frequency domain resource is the wideband 0; or when none of data or control channel is transmitted on the CSI time domain reference resource, the CSI frequency domain reference resource is a pre-defined wideband; or assuming that the CSI time domain reference resource includes 2 subframes and the pre-defined wideband is the wideband 0 and the wideband 1, the CSI frequency domain reference resource on the 2 subframes is respectively the wideband 0 and the wideband 1.

Taking the wideband 0 and the wideband 1 as examples, other manners for indicating the wideband are not excluded.

In the step 1602, it is assumed that the CSI is reported periodically and that the configured reporting mode is the wideband feedback, if the reporting mode is Mode 1-0:
the subframe for reporting the CQI: the terminal determines the value of the wideband CQI according to all narrowbands/widebands corresponding to the CSI reference resource; or
if the reporting mode is Mode 1-1:
the subframe for reporting the CQI/PMI: the terminal determines the value of the wideband CQI according to all narrowbands/widebands corresponding to the CSI reference resource; and the terminal selects one pre-coded matrix from the codebook according to all narrowbands/widebands corresponding to the CSI reference resource and reports the pre-coded matrix;
alternatively, it is assumed that the CSI is reported periodically and the configured reporting mode is the narrowband feedback,
if the reporting mode is Mode 2-0:
the subframe for reporting the CQI: the terminal determines the value of the narrowband CQI according to one narrowband of narrowbands corresponding to the CSI reference resource; or
if the reporting mode is Mode 2-1:
the subframe for reporting the CQI/PMI: the terminal determines the value of the narrowband CQI according to one narrowband of narrowbands corresponding to the CSI reference resource; and besides the CQI, the terminal selects one pre-coded matrix PMI from the codebook according to all narrowbands/widebands corresponding to the CSI reference resource and reports the pre-coded matrix PMI;
where one narrowband of narrowbands corresponding to the CSI reference resource is selected according to the pre-defined rule, or the UE reports the narrowband index corresponding to the one narrowband at the same time;
alternatively, it is assumed that the CSI is reported non-periodically and the configured reporting mode is the wideband feedback,
the terminal determines the value of the wideband CQI according to all narrowbands/widebands corresponding to the CSI reference resource;
alternatively, it is assumed that the CSI is reported non-periodically and the configured reporting mode is the narrowband selected by the UE,
the terminal determines the value of the narrowband CQI according to one narrowband of narrowbands corresponding to the CSI reference resource, and the terminal reports the value of CQI and the narrowband index of the obtained CQI;
alternatively, it is assumed that the CSI is reported non-periodically and the configured reporting mode is the narrowband configured for the high layer,
the terminal determines the value of the narrowband CQI according to one narrowband of narrowbands corresponding to the CSI reference resource, where the narrowband index is configured through the high-layer signaling.

When the CQI is reported, if the wideband PMI also needs to be reported, the terminal selects one pre-coded matrix from the codebook according to all narrowbands/widebands corresponding to the CSI reference resource and reports the pre-coded matrix; or when the CQI is reported, if multiple PMIs also need to be reported, the terminal selects the pre-coded matrix from the codebook according to every narrowband of all narrowbands corresponding to the CSI reference resource and reports the pre-coded matrix.

The reported specific signaling depends on the supported reporting mode.

In the embodiments described above, the resource ending location is obtained through the resource starting location and the number of resources. The number of resources is obtained through the resource starting location and the resource ending location.

In the embodiments described above, assuming that the channel bandwidth is 5 MHz, the resources indicated by the resource allocation domain are 4 narrowbands, the corresponding number of resources may be 24 RBs or 25 RBs, which depends on the maximum number of RBs supported by the channel agreed by the base station and the terminal.

In the embodiments described above, assuming that the channel bandwidth is 20 MHz, the resources indicated by the resource allocation domain are 16 narrowbands, the corresponding number of resources may be 96 RBs or 100 RBs, which depends on the maximum number of RBs supported by the channel agreed by the base station and the terminal.

The embodiment of the present disclosure further provides a storage medium. Optionally, in the embodiment, the storage medium described above may be configured to store program codes for executing the steps described below.

In step S1, a resource is configured for transmission of a physical shared channel of a terminal through a resource allocation parameter.

In step S2, the resource allocation parameter is sent to the terminal through signaling.

The resource allocation parameter includes at least one of: a wideband indication, a resource location in a wideband, a subframe where the wideband is located, a wideband mode or a resource location.

Optionally, in the embodiment, the storage medium described above may include, but is not limited to, a USB flash drive, a read-only memory (ROM), a random access memory (RAM), a mobile hard disk, a magnetic disk, an optical disk or another medium capable of storing the program codes.

In an exemplary embodiment, for specific examples in the embodiment, reference may be made to the examples described in the above embodiments and exemplary embodiments, and repetition will not be made in the embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

INDUSTRIAL APPLICABILITY

Through the embodiments of the present disclosure, the base station configures a resource for transmission of a physical shared channel of a terminal through a resource allocation parameter, and sends the resource allocation parameter to the terminal. In such a way, the resource allocation considers not only 1.4 MHz narrowband bandwidth limitation, the MTC terminal supports MTC applications with higher data rate.

What is claimed is:

1. A method for resource allocation, comprising:
configuring, by a base station, a resource for transmission of a physical shared channel of a terminal through a resource allocation parameter; and
sending, by the base station, the resource allocation parameter to the terminal through signaling;
wherein the resource allocation parameter comprises at least one of: a wideband indication, a resource location in a wideband, a wideband enabling subframe, a wideband mode or a resource location; wherein
the wideband has a basic unit of narrowband: the wideband comprises a number X of narrowbands and a total bandwidth of the wideband does not exceed a number Y of RBs, wherein the X narrowbands are X narrowbands with continuous narrowband indexes; or
the wideband has a basic unit of RB: the wideband comprises the number Y of RBs, wherein the Y RBs are Y RBs with continuous RB indexes;
wherein X and Y are preset values.

2. The method according to claim 1, wherein the wideband indication is determined according to at least one of: a wideband preset index, a wideband offset or a narrowband index,
wherein the wideband preset index is determined according to a location of the wideband in a system bandwidth;
the wideband offset is one of:
a number of narrowbands or physical resource blocks (PRBs) of a offset of a wideband starting location relative to a preset wideband starting location,
the number of narrowbands or PRBs of the offset of the wideband starting location relative to a preset narrowband starting location, or
the wideband starting location and a number of PRBs of a preset PRB offset; and
the narrowband index is a narrowband index corresponding to a narrowband of the wideband starting location.

3. The method according to claim 1, wherein the resource location in the wideband is determined through at least one parameter of a group consisting of: narrowband enabling in the wideband, an RB set in the narrowband, a narrowband set in the wideband, an RB set in the wideband, an RB group set in the wideband, an RB group enabling in the wideband, a resource starting location in the wideband and a resource ending location in the wideband.

4. The method according to claim 3, wherein the RB group comprises a number N of RBs, wherein N has a fixed value, or is determined according to a number of RBs in the wideband, or is determined according to the number of RBs in the system bandwidth.

5. The method according to claim 1, wherein the resource location comprises at least one of: a resource starting location, a resource ending location and a number of resources.

6. The method according to claim 1, wherein the step of sending, by the base station, the resource allocation parameter to the terminal through signaling comprises:
sending, by the base station, the wideband indication to the terminal through at least one of high-layer signaling or downlink control information (DCI),
wherein the wideband indication occupies a number x of bits for indicating a wideband preset index; or
the wideband indication occupies a number x1+x2 of bits, x1 bits for indicating the wideband preset index and x2 bits indicating a wideband offset; or
the wideband indication occupies a number x3 of bits for indicating a narrowband index corresponding to a narrowband of a wideband starting location.

7. The method according to claim 1, wherein the step of sending, by the base station, the resource allocation parameter to the terminal through signaling comprises:
sending, by the base station, the resource location in the wideband to the terminal through DCI,
wherein the resource location in the wideband occupies a number y1+y2 of bits, y1 bits for indicating a narrowband enabling state in the wideband and y2 bits for indicating an RB set in the narrowband;
the resource location in the wideband occupies a number y3+y2 of bits, y3 bits for indicating the narrowband set and y2 bits for indicating the RB set in the narrowband, wherein y3 is determined according to a number of narrowbands in the wideband;
the resource location in the wideband occupies a number y4 of bits for indicating an RB set in the wideband, wherein y4 is determined according to a number of RBs in the wideband;
the resource location in the wideband occupies a number y5 of bits for indicating an RB group set in the wideband, wherein y5 is determined according to a number of RB groups in the wideband;
the resource location in the wideband occupies a number y6 of bits for indicating a RB group enabling state in the wideband, wherein y6 is equal to a number of PRB groups in the wideband;
the resource location in the wideband occupies a number y7 of bits for indicating a resource starting location in the wideband and a resource ending location in the wideband;
the resource location in the wideband occupies a number y8+y9 of bits, y8 bits for indicating the resource starting location in the wideband, and y9 bits for indicating the resource ending location in the wideband;
the resource location in the wideband occupies a number M of bits for indicating the RB set in the wideband and the RB group set in the wideband; or
the resource location in the wideband occupies the number y1 of bits for indicating the narrowband enabling state in the wideband;
wherein y1 has a value less than or equal to the number of narrowbands in the wideband.

8. The method according to claim 1, wherein the step of sending, by the base station, the resource allocation parameter to the terminal through signaling comprises at least one of:
sending, by the base station, the wideband enabling subframe to the terminal through the high-layer signaling, wherein the wideband enabling subframe occupies a number 10*z of bits for indication, and z is a fixed positive integer; or sending, by the base station, the wideband mode to the terminal through the high-layer signaling, wherein the wideband mode occupies 1 bit for indication.

9. A method for resource determination, comprising:
receiving, by a terminal, a resource allocation parameter corresponding to a physical shared channel sent by a base station; and transmitting, by the terminal, the physical shared channel according to the resource allocation parameter;

wherein the resource allocation parameter comprises at least one of: a wideband indication, a resource location in a wideband, a wideband enabling subframe, a wideband mode or a resource location; wherein the wideband has a basic unit of narrowband: the wideband comprises a number X of narrowbands, and a total bandwidth of the wideband does not exceed a number Y of RBs, wherein the X narrowbands are X narrowbands with continuous narrowband indexes; or the wideband has a basic unit of RB: the wideband comprises the number Y of RBs, wherein the Y RBs are Y RBs with continuous RB indexes;

wherein X and Y are preset values.

10. The method according to claim 9, wherein the wideband indication is determined according to at least one of: a wideband preset index, a wideband offset or a narrowband index, wherein the wideband preset index is determined according to a location of the wideband in a system bandwidth;

the wideband offset is one of:
a number of narrowbands or physical resource blocks (PRBs) of a offset of a wideband starting location relative to a preset wideband starting location, or
the number of narrowbands or PRBs of the offset of the wideband starting location relative to a preset narrowband starting location, or
the wideband starting location and a number of PRBs of a preset PRB offset; and
the narrowband index is a narrowband index corresponding to a narrowband of the wideband starting location.

11. The method according to claim 9, wherein the resource location in the wideband is determined through at least one parameter of a group consisting of: narrowband enabling in the wideband, an RB set in the narrowband, a narrowband set in the wideband, an RB set in the wideband, a RB group set in the wideband, a RB group enabling in the wideband, a resource starting location in the wideband and a resource ending location in the wideband.

12. The method according to claim 11, wherein the resource block group comprises a number N of RBs, wherein N has a fixed value, or is determined according to a number of RBs in the wideband, or is determined according to the number of RBs in the system bandwidth.

13. The method according to claim 9, wherein the resource location comprises at least one of: a resource starting location, a resource ending location and a number of resources.

14. The method according to claim 9, wherein the step of receiving, by a terminal, a resource allocation parameter corresponding to a physical shared channel and sent by a base station comprises:
receiving, by the terminal, at least one of high-layer signaling or downlink control information (DCI) sent by the base station, wherein the at least one of the high-layer signaling or the DCI comprises wideband indication information,
wherein the wideband indication occupies a number x of bits for indicating a wideband preset index; or
the wideband indication occupies a number x1+x2 of bits, x1 bits for indicating the wideband preset index and x2 bits for indicating a wideband offset; and
a narrowband index is a narrowband index corresponding to a narrowband of a wideband starting location.

15. The method according to claim 9, wherein the step of receiving, by a terminal, a resource allocation parameter corresponding to a physical shared channel sent by a base station comprises:
receiving, by the terminal, DCI sent by the base station, wherein the DCI comprises indication information of the resource location in the wideband:
the resource location in the wideband is indicated in at least one of following modes:
the resource location in the wideband occupies a number y1+y2 of bits, y1 bits for indicating a narrowband enabling state in the wideband and y2 bits for indicating an RB set in the narrowband, wherein y1 has a value less than or equal to a number of narrowbands in the wideband;
the resource location in the wideband occupies a number y3+y2 of bits, y3 bits for indicating a narrowband set and y2 bits for indicating the RB set in the narrowband, wherein y3 is determined according to the number of narrowbands in the wideband;
the resource location in the wideband occupies a number y4 of bits for indicating an RB set in the wideband, wherein y4 is determined according to a number of RBs in the wideband;
the resource location in the wideband occupies a number y5 of bits for indicating an RB group set in the wideband, wherein y5 is determined according to a number of RB groups in the wideband;
the resource location in the wideband occupies a number y6 of bits for indicating an RB group enabling state in the wideband, wherein y6 is equal to a number of PRB groups in the wideband;
the resource location in the wideband occupies a number y7 of bits for indicating a resource starting location in the wideband and a resource ending location in the wideband;
the resource location in the wideband occupies a number y8+y9 of bits, y8 bits for indicating the resource starting location in the wideband and y9 bits for indicating the resource ending location in the wideband;
the resource location in the wideband occupies a number M of bits for indicating the RB set in the wideband and the RB group set in the wideband; or
the resource location in the wideband occupies the number y1 of bits for indicating the narrowband enabling state in the wideband;
wherein y1 has a value less than or equal to the number of narrowbands in the wideband.

16. The method according to claim 9, wherein the step of receiving, by a terminal, a resource allocation parameter corresponding to a physical shared channel sent by a base station comprises at least one of:
receiving, by the terminal, the high-layer signaling sent by the base station,
wherein the high-layer signaling comprises the wideband enabling subframe, the wideband enabling subframe occupies a number 10*z of bits for indication, wherein z is a fixed positive integer; or the high-layer signaling comprises the wideband mode.

17. An apparatus for resource determination, applied to a terminal side and comprising:
    a processor; and
    a memory for storing instructions executable by the processor,
    wherein the processor is configured to implement the method according to claim 9.

18. An apparatus for resource allocation, applied to a base station and comprising:
    a processor; and
    a memory for storing instructions executable by the processor,
    wherein the processor is configured to:
    configure a resource for transmission of a physical shared channel of a terminal through a resource allocation parameter; and
    send the resource allocation parameter to the terminal through signaling;
    wherein the resource allocation parameter comprises at least one of: a wideband indication, a resource location in a wideband, a wideband enabling subframe, a wideband mode or a resource location; wherein
    the wideband has a basic unit of narrowband: the wideband comprises a number X of narrowbands and a total bandwidth of the wideband does not exceed a number Y of RBs, wherein the X narrowbands are X narrowbands with continuous narrowband indexes; or
    the wideband has a basic unit of RB: the wideband comprises the number Y of RBs, wherein the Y RBs are Y RBs with continuous RB indexes;
    wherein X and Y are preset values.

* * * * *